(12) United States Patent
Feng et al.

(10) Patent No.: US 12,362,951 B2
(45) Date of Patent: Jul. 15, 2025

(54) BLOCK CHAIN-BASED DATA PROCESSING METHOD AND RELATED APPARATUS

(71) Applicant: Tencent Technology (Shenzhen) Company Limited, Shenzhen (CN)

(72) Inventors: Haoming Feng, Shenzhen (CN); Yong Zhao, Shenzhen (CN); Shipeng Chen, Shenzhen (CN); Shengqian Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 246 days.

(21) Appl. No.: 18/212,637

(22) Filed: Jun. 21, 2023

(65) Prior Publication Data

US 2023/0336368 A1    Oct. 19, 2023

Related U.S. Application Data

(63) Continuation of application No. PCT/CN2022/131599, filed on Nov. 14, 2022.

(30) Foreign Application Priority Data

Jan. 25, 2022    (CN) .......................... 202210090413.8

(51) Int. Cl.
*G06F 16/00*        (2019.01)
*G06F 16/23*        (2019.01)
(Continued)

(52) U.S. Cl.
CPC ............ *H04L 9/50* (2022.05); *G06F 16/2315* (2019.01); *G06F 16/27* (2019.01)

(58) Field of Classification Search
None
See application file for complete search history.

(56) References Cited

U.S. PATENT DOCUMENTS

| 10,706,041 B1* | 7/2020 | Hoffmann ............ G06F 11/2097 |
| 2007/0061379 A1* | 3/2007 | Wong ....................... G06F 16/27 |

(Continued)

FOREIGN PATENT DOCUMENTS

| CN | 110738497 A | 1/2020 |
| CN | 111882322 A | 11/2020 |
| CN | 112926981 A | 6/2021 |

OTHER PUBLICATIONS

Tencent Technology (Shenzhen) Company Limited, ISR, PCT/CN2022/131599, Jan. 28, 2023, 2 pgs.

*Primary Examiner* — Hasanul Mobin
(74) *Attorney, Agent, or Firm* — Morgan, Lewis & Bockius LLP

(57) ABSTRACT

This application discloses a block chain-based data processing method performed by a computer device, including: acquiring a pending transaction including a pending execution order identifier; adding, when determining that the pending transaction is in the prepared state, the pending transaction and the pending execution order identifier to the pending account ready queue to obtain a transitional account ready queue; using an execution order identifier that forms a continuous sequence of order identifiers with the pending execution order identifier as an upgraded execution order identifier in the pending account waiting queue, and adding the upgraded execution order identifier and a waiting transaction corresponding to the upgraded execution order identifier to the transitional account ready queue in sequence to obtain an upgraded account ready queue; and adding the pending transaction and the waiting transaction corresponding to the upgraded execution order identifier in the upgraded account ready queue to an aggregate ready queue.

17 Claims, 10 Drawing Sheets

(51) Int. Cl.
  *G06F 16/27*    (2019.01)
  *H04L 9/00*     (2022.01)

(56) References Cited

U.S. PATENT DOCUMENTS

| | | | |
|---|---|---|---|
| 2017/0061405 A1* | 3/2017 | Bryant | G06Q 20/4014 |
| 2017/0068566 A1* | 3/2017 | Hosie | G06F 9/4881 |
| 2020/0013025 A1* | 1/2020 | Verma | H04L 9/3297 |
| 2020/0042513 A1* | 2/2020 | Shima | G06F 16/2379 |
| 2020/0394176 A1* | 12/2020 | Wu | G06F 16/22 |
| 2020/0394648 A1* | 12/2020 | Blackshear | H04L 63/12 |
| 2021/0184833 A1* | 6/2021 | Srivastava | G06F 16/21 |

\* cited by examiner

BLOCK CHAIN-BASED DATA PROCESSING METHOD AND RELATED APPARATUS

CROSS-REFERENCE TO RELATED APPLICATIONS

This application is a continuation application of PCT Patent Application No. PCT/CN2022/131599, entitled "IMAGE ACQUISITION MODEL TRAINING METHOD AND APPARATUS, IMAGE DETECTION METHOD AND APPARATUS, AND DEVICE" filed on Nov. 14, 2022, which claims priority to Chinese Patent Application No. 202210090413.8, entitled "BLOCK CHAIN-BASED DATA PROCESSING METHOD, DEVICE, AND READABLE STORAGE MEDIUM" filed to China National Intellectual Property Administration on Jan. 25, 2022, all of which is incorporated herein in its entirety by reference.

FIELD OF THE TECHNOLOGY

This application relates to the field of computer technologies, in particular to a block chain-based data processing method, a device, and a readable storage medium.

BACKGROUND OF THE DISCLOSURE

In execution of a transaction, the txNonce (Transaction Number once) corresponding to the transaction has to be equal to the accountNonce (Account Number once) corresponding to the block chain account transmitting the transaction, or the transaction is an invalid transaction otherwise. As long as at least one transaction in a block is an invalid transaction, the block cannot reach a consensus and cannot be on-chained. The txNonce is used for identifying a transaction execution order that the block chain account transmitting the transaction expects for the transaction in transactions transmitted by the block chain account, and it is incremented from 0; the accountNonce is used for identifying a transaction quantity that the block chain account has executed in a current world status, and it is incremented from 0.

At present, in a block chain network, after receiving a transaction, a block chain node will put the transaction into a transaction pool for caching, and then pack some of transactions in the transaction pool to generate a block. However, due to network fluctuations or user maloperations, the transactions of different txNonces under the same block chain account may not arrive at the block chain node entirely from small to large, resulting in that the transactions are wrongly considered to be illegal and cannot be received by the transaction pool. The error tolerance of the block chain system is low. Even if the transactions can be received by the transaction pool, there may be a problem that a txNonce of a transaction included in the generated block does not match the accountNonce of the account transmitting the transaction in the current world status, resulting in that the block cannot reach a consensus and cannot be on-chained.

SUMMARY

Embodiments of this application provide a block chain-based data processing method, a device, and a readable storage medium, which can increase the error tolerance of a block chain system and improve the success rate of block on-chaining.

In one aspect, an embodiment of this application provides a block chain-based data processing method performed by a computer device, the method including:
  acquiring a pending transaction, a pending account ready queue and a pending account waiting queue corresponding to a pending account: the pending transaction comprising a pending execution order identifier;
  adding, in response to determining that the pending transaction is in a prepared state, the pending transaction and the pending execution order identifier to the pending account ready queue to obtain a transitional account ready queue;
  using an execution order identifier that forms a continuous sequence of order identifiers with the pending execution order identifier as an upgraded execution order identifier in the pending account waiting queue, and adding the upgraded execution order identifier and a waiting transaction corresponding to the upgraded execution order identifier to the transitional account ready queue in sequence to obtain an upgraded account ready queue; and
  adding the pending transaction and the waiting transaction corresponding to the upgraded execution order identifier in the upgraded account ready queue to an aggregate ready queue.

In one aspect, an embodiment of this application provides a computer device, the computer device including: a processor, a memory, and a network interface:
  the processor above being connected to the memory above and the network interface above, the network interface above being configured to provide a data communication network element, the memory above being configured to store a computer program that, when executed by the processor, causes the computer device to perform the method in the embodiment of this application.

In one aspect, an embodiment of this application provides a non-transitory computer-readable storage medium storing a computer program that, when executed by a processor of a computer device, causes the computer device to perform the method in the embodiment of this application.

In the embodiments of this application, ready transactions in a prepared state and execution order identifiers with mapping relationships with the ready transactions of a pending account will be stored in a pending account ready queue, and waiting transactions in an unprepared state and execution order identifiers with mapping relationships with the waiting transactions of the pending account will be stored in a pending account waiting queue. Then when a pending transaction including a pending execution order identifier transmitted by the pending account is acquired, in response to determining that the pending transaction is in the prepared state, the pending transaction and the pending execution order identifier are added to the pending account ready queue to obtain a transitional account ready queue. Then an execution order identifier that forms a continuous sequence of order identifiers with the pending execution order identifier is used as an upgraded execution order identifier in the pending account waiting queue, and the upgraded execution order identifier and a waiting transaction corresponding to the upgraded execution order identifier are added to the transitional account ready queue in sequence to obtain an upgraded account ready queue. Meanwhile, the pending transaction and the waiting transaction corresponding to the upgraded execution order identifier in the upgraded account ready queue are added to an aggregate ready queue. The transactions in the aggregate ready queue are packed into a candidate block in a transaction insertion time sequence. With the method provided in the embodiment of this application, all of the ready transactions in the prepared state of the pending account are stored in the pending account ready queue, and only the ready transactions of the pending account can be added to the aggregate ready queue, so as to ensure that waiting transactions in the unprepared state do not occur in the candidate block generated based on transaction packing in the aggregate ready queue, thus improving the success rate of block on-chaining. In addition, transactions in the unprepared state transmitted by the pending account will not be rejected, but temporarily stored in the pending account waiting queue. Whenever a new transaction in the prepared state of the pending account is added to the pending account ready queue, the pending account waiting queue is upgraded, and a qualified waiting transaction will be added to the pending account ready queue and further added to the aggregate ready queue for packing, thereby increasing the error tolerance of the block chain system.

BRIEF DESCRIPTION OF THE DRAWINGS

In order to illustrate the technical solutions in the embodiments of this application or in the related art more clearly, the following briefly introduces the accompanying drawings for describing the embodiments or the related art. Apparently, the accompanying drawings in the following description show merely some embodiments of this application, and a person of ordinary skill in the art may still derive other drawings from the accompanying drawings without creative efforts.

DESCRIPTION OF EMBODIMENTS

Figure 1:
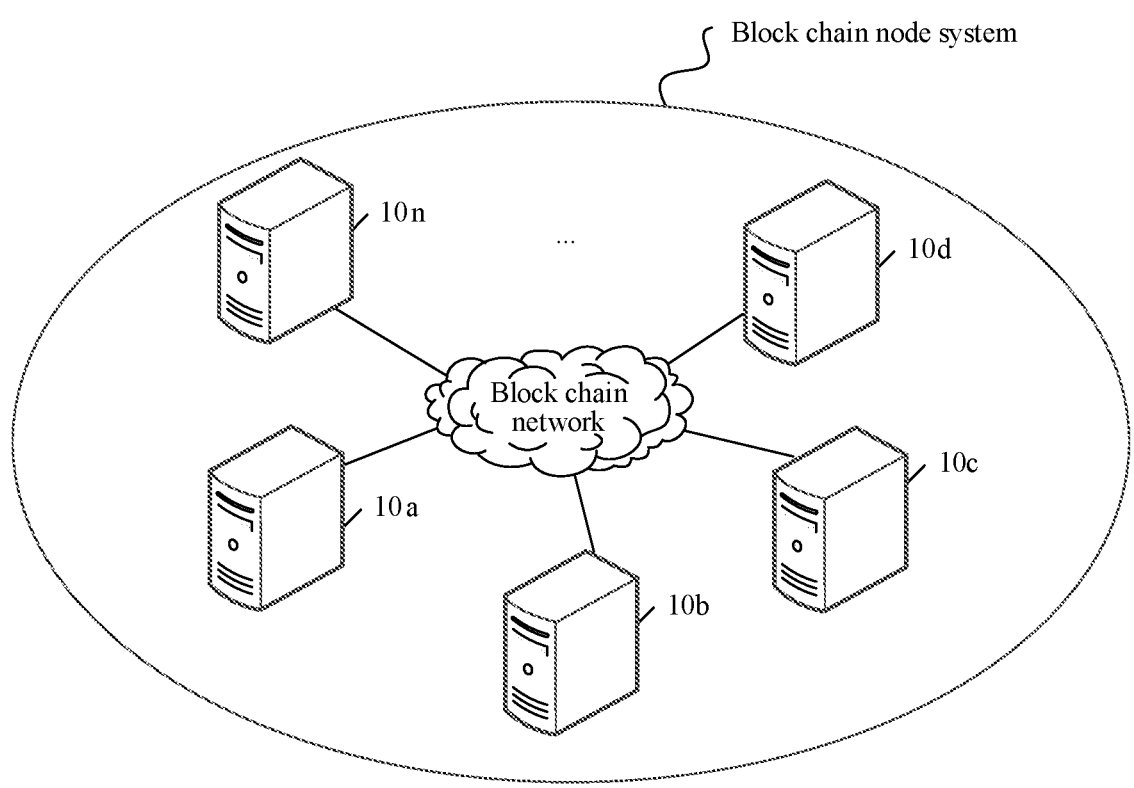
FIG. 1 is a schematic structural diagram of a block chain node system according to an embodiment of this application.

The technical solutions in embodiments of this application are clearly and completely described in the following with reference to the accompanying drawings in the embodiments of this application. Apparently, the described embodiments are only a few, but not all embodiments of this application. Based on the embodiments of this application, all other embodiments obtained by a person of ordinary skill in the art without inventive effort shall fall within the protection scope of this application.

In order to facilitate understanding, the following will explain the block chain and concepts related thereto.

Block chain is a new application mode of computer technology, such as distributed data storage, point-to-point transmission, consensus mechanism, and encryption algorithm, and it is mainly used to sort data in a time sequence and encrypt it into a ledger, so that it cannot be manipulated or forged, and at the same time, the data can be verified, stored, and updated. Block chain is essentially a decentralized database, and each node in the database stores an identical block chain, and a block chain network can distinguish nodes into consensus nodes and service nodes, where the consensus nodes are responsible for the consensus of the whole block chain network. The process of writing transaction data into a ledger in the block chain network can be as follows. A client transmits the transaction data to a service node, and then the transaction data is transmitted among the service nodes in the block chain network in a relay baton manner until a consensus node receives the transaction data: the consensus node then packs the transaction data into a block and reaches a consensus with other consensus nodes; and after the consensus is passed, the block carrying the transaction data is written into the ledger.

A block is a data packet carrying transaction data (i.e., transaction service) on a block chain network, and is a data structure marked with a time stamp and a Hash value of a previous block. The block is verified by a consensus mechanism of the network and transactions in the block are determined.

A Hash value, also referred to as an information eigenvalue or characteristic value, is generated by converting an input data of an arbitrary length into a password and outputting it fixedly through a Hash algorithm. The original input data cannot be retrieved by decrypting the Hash value, which is an one-way encryption function. In the block chain, each block (except the original block) includes a Hash value of a preceding block, which is referred to as a parent block of the current block. Hash value is a potential core foundation and the most important aspect in block chain technology, preserving the authenticity of recording and viewing data, as well as the integrity of the block chain as a whole.

A block chain account has an account address as a unique identifier thereof. A balance is included in the block chain account as a digital resource of the block chain account in the current world status. The block chain account corresponds to an accountNonce for recording how many transactions transmitted by the block chain account have been executed in the current world status. The initial value of the accountNonce is 0, and when a transaction under the block chain account is executed, the accountNonce is incremented by 1. Wherever the account is mentioned in the subsequent embodiments of this application, it refers to the block chain account, which will not be repeated.

A transaction transmitted by a block chain account has a transaction Hash as a unique identifier thereof, includes an account address identifying the block chain account which transmits the transaction, and includes a txNonce identifying a transaction execution order that the block chain account to which the transaction belongs expects for the transaction in the current world status. For example, a txNonce of a transaction expected by the block chain account to be executed firstly is 0, and a txNonce of a transaction expected to be executed secondly is 1, and so on. Therefore, the txNonce of the transaction has to be equal to the accountNonce of the block chain account before the transaction is executed in the current world status, or the transaction is an invalid transaction otherwise. As long as at least one transaction in a block is an invalid transaction, the block cannot reach a consensus and cannot be on-chained. A txFee (transaction fee) field is further included in the transaction as an overhead that the block chain account needs to pay for the block chain system executing the transaction. For different block chain types, the txFee field may be calculated from certain fields by established rules, e.g., value (transfer amount)+gas (consumption)*gasPrice (unit price of consumption).

Each block includes several transactions. The process of inserting a block into a block chain data structure within each block chain node through consensus is referred to as on-chaining.

A world status is a view formed by persistent data owned by accounts in the block chain. Since the execution of a transaction itself modifies part of the persistent data of several accounts, the execution of each transaction in each block will result in a new world status, and the world status of each block chain node will be updated after each block is on-chained. After the same block is on-chained, the world status of each of the block chain nodes has to be consistent.

Reference is made to FIG. 1 which is a schematic structural diagram of a block chain node system according to an embodiment of this application. The block chain node system shown in FIG. 1 may correspond to a block chain network, which may include, but is not limited to, a block chain network to which a consortium block chain corresponds. The block chain node system refers to a system for sharing data among block chain nodes, where the block chain node system may include a plurality of block chain nodes which may specifically include a block chain node 10a, a block chain node 10b, a block chain node 10c, a block chain node 10d, . . . , and a block chain node 10n. Each block chain node may receive data transmitted from the outside during normal operation, perform block on-chaining based on the received data, and may transmit data to the outside as well. In order to ensure data intercommunication among the block chain nodes, data connections may exist between the block chain nodes. For example, a data connection exists between the block chain node 10a and the block chain node 10b, a data connection exists between the block chain node 10a and the block chain node 10c, and a data connection exists between the block chain node 10b and the block chain node 10c.

It is to be understood that data or block transmission may be carried out between block chain nodes via the data connections described above. The block chain network can realize data connections between the block chain nodes based on node identifiers. Each block chain node in the block chain network has a corresponding node identifier, and each block chain node above can store node identifiers of other block chain nodes that have connection relationships with the block chain node, so as to subsequently broadcast the acquired data or the generated block to the other block chain nodes based on the node identifiers of the other block chain nodes. For example, the block chain node 10a can maintain a node identifier list as shown in Table 1. The node identifier list stores node names and node identifiers of other nodes.

TABLE 1

| Node name | Node identifier |
|---|---|
| Node 10a | 117.114.151.174 |
| Node 10b | 117.116.189.145 |
| Node 10c | 117.114.151.183 |
| Node 10d | 117.117.125.169 |
| . . . | . . . |
| Node 10n | 117.116.189.125 |

The node identifier can be an Internet Protocol (IP) address and any other information which can be used for identifying a node in a block chain network. The IP address is only exemplified for illustration in Table 1. For example, the block chain node 10a may transmit information (e.g., a block) to the block chain node 10b via the node identifier 117.116.189.145, and the block chain node 10b may determine via the node identifier 117.114.151.174 that the information was transmitted from the block chain node 10a.

In a block chain, before a block is on-chained, the block has to be subject to consensus nodes in the block chain network for consensus, and the block can be added to the block chain after the consensus is passed. It is to be understood that not all of participating nodes in the block chain (i.e., the block chain nodes in the block chain node system above) have sufficient resources and necessity to become consensus nodes of the block chain when the block chain is used in some scenarios of government or commercial organizations. For example, in the block chain node system shown in FIG. 1, the block chain node 10a, the block chain node 10b, the block chain node 10c, and the block chain node 10d may serve as consensus nodes in the block chain node system. The consensus nodes in the block chain node system participate in consensus, i.e., performing consensus on a block (including a batch of transactions), including generating the block and voting on the block. Non-consensus nodes do not participate in consensus, but help propagate the block and voting messages, and synchronize statuses with each other, etc.

It is to be understood that the data connections above are not limited a connection mode, and can be directly or indirectly connected via a wired communication mode, directly or indirectly connected via a wireless communication mode, and connected via other connection modes as well, which is not limited in this application.

It is to be understood that the data processing method provided by the embodiment of this application can be performed by a computer device, including but not limited to the block chain node above (which can be a server or a terminal). The server above may be an independent physical server, a server cluster or distributed system formed by a plurality of physical servers, or a cloud server that provides basic cloud computing services, such as cloud services, cloud databases, cloud computing, cloud functions, cloud storage, network services, cloud communication, middleware services, domain name services, security services, CDN, big data, and artificial intelligence platforms. The terminal above may be a smartphone, a tablet computer, a notebook computer, a desktop computer, a smart speaker, a smartwatch, and the like, but is not limited thereto.

It is to be understood that the embodiment of this application is applicable to various scenarios, including but not limited to cloud technology, artificial intelligence, intelligent transportation, and aided driving.

It is to be understood that in the detailed description of this application, related data, such as transaction data, need to be approved or agreed upon by the user when the above embodiments of this application are applied to a specific product or technology, and the collection, use, and processing of related data need to comply with relevant laws, regulations, and standards of relevant countries and regions.

The block chain node may include the following modules.

A transaction pool stores transactions that are known in a block chain network but not yet included in the block chain. The block chain node caches the received transactions through the transaction pool, and will submit the transaction whose txNonce is equal to the accountNonce of the block chain account to which it belongs in the current world status and the transactions with continuous subsequent txNonces to a consensus module for packing, consensus, and block generation. When a new block has a consensus reached and then inserted into the block chain structure, a refresh operation of the transaction pool is triggered, i.e., the transactions already included in the block chain are deleted.

A consensus module packs the transactions to generate a candidate block, and a consensus is reached among the block chain nodes based on a consensus algorithm to generate a new block.

A block chain structure is a chain structure formed by linking all blocks end to end, which stores all transactions of the block chain system.

A world status is a data set of all accounts after the transactions in a latest block in the current block chain structure have been executed.

A configuration module stores relevant configurations such as an aggregate transaction pool upper limit, a single account upper limit, and a block transaction quantity upper limit.

As shown in FIG. 1, transactions transmitted by a block chain account are broadcast to all block chain nodes. However, due to problems such as a network delay and a long transmission distance, the block chain nodes do not necessarily receive transactions belonging to the same block chain account in an order of small to large execution order identifiers (i.e., the txNonces above). Therefore, in transactions cached in the transaction pool, among execution order identifiers corresponding to transactions transmitted by a certain block chain account, a minimum execution order identifier may not be equal to a currently executed transaction quantity (i.e., the accountNonce above) of the block chain account in a current world status, or the execution order identifiers corresponding to the transactions transmitted by the certain block chain account may be discontinuous. In this regard, a block chain node in the block chain node system may perform refined management on the transactions cached in the transaction pool.

In a possible implementation, the block chain node may manage the transactions in the transaction pool in a dimension of account, and further divide transactions transmitted by the same account into an account ready queue and an account waiting queue. With an account being exemplified as a pending account, the pending account corresponds to a pending account ready queue and a pending account waiting queue. The pending account ready queue is used for storing ready transactions in a prepared state and execution order identifiers with mapping relationships with the ready transactions transmitted by the pending account. The pending account waiting queue is used storing waiting transactions in an unprepared state and execution order identifiers with mapping relationships with the waiting transactions transmitted by the pending account. The execution order identifiers corresponding to the ready transactions in the prepared state satisfy a continuous order relationship, and the minimum execution order identifier in the pending account ready queue is the same as the currently executed transaction quantity corresponding to the pending account in the current world status. The ready transactions in the pending account ready queue will be added to an aggregate ready queue while being added to the pending account ready queue. In addition, ready transactions in a prepared state transmitted by other accounts in the block chain network will also be added to the aggregate ready queue while being added to a corresponding account ready queue. The transactions in the aggregate ready queue will be packed into a candidate block in a transaction insertion time sequence. Therefore, the transactions packed into the candidate block can all be executed in an execution order indicated by the execution order identifiers thereof, and the probability will be increased for passing a consensus of the candidate block.

Therefore, the block chain node, when receives a pending transaction newly transmitted by the pending account, may first determine whether the pending transaction is in a prepared state. In response to determining that the pending transaction is in the prepared state, the pending transaction and a pending execution order identifier corresponding to the pending transaction are added to the pending account ready queue to obtain a transitional account ready queue. The block chain node can then perform transaction upgrade on the pending account waiting queue. Namely, an execution order identifier that forms a continuous sequence of order identifiers with the pending execution order identifier is used as an upgraded execution order identifier in the pending account waiting queue, and the upgraded execution order identifier and a waiting transaction corresponding to the upgraded execution order identifier are migrated to the transitional account ready queue in sequence to obtain an upgraded account ready queue. Finally, the block chain node can add the pending transaction and the waiting transaction corresponding to the upgraded execution order identifier in the upgraded account ready queue to the aggregate ready queue for packing.

Figure 2:
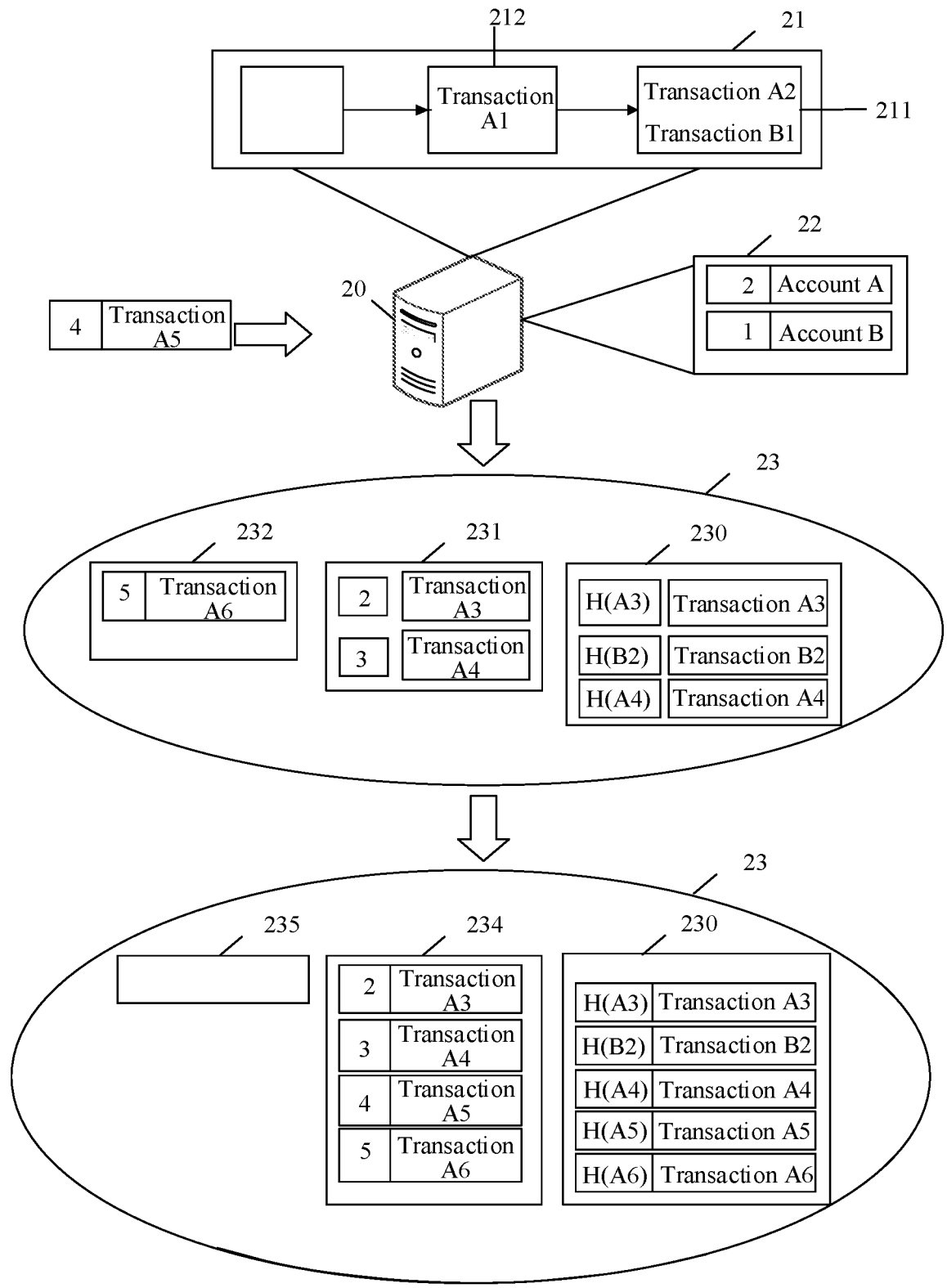
FIG. 2 is a schematic diagram of a scenario of a block chain-based data processing according to an embodiment of this application.

In order to facilitate understanding the block chain node processing the pending transaction transmitted by the pending account, reference is made to FIG. 2 which is a schematic diagram of a scenario of a block chain-based data processing according to an embodiment of this application. The block chain node 20 shown in FIG. 2 may be any block chain node in the block chain node system in the above embodiments corresponding to FIG. 1. For example, the block chain node 20 may be the block chain node 10a.

As shown in FIG. 2, the block chain node 20 includes a block chain 21 that includes a plurality of blocks, e.g. A block 211, a block 212, etc. The blocks may include a plurality of transactions transmitted by different accounts. For example, the block 211 includes a transaction A2, a transaction B1, etc; and the block 212 includes a transaction A1, etc. The transaction A2 and the transaction A1 are transactions transmitted by an account A, and transaction B1 is a transaction transmitted by an account B. The block chain node 20 further includes execution data 22 in the current world status. The current world status refers to a world status of a block chain network after the block 211 is on-chained to the block chain 21, and the world status corresponding to the block chain network refers to a view formed by persistent data owned by accounts in the block chain network. Since the execution of a transaction can change an account resource corresponding to the account, whenever a new block is on-chained to block chain 21, the world status changes. That is, when different blocks are on-chained to the block chain 21, the world status of the block chain network is different. The execution data 22 includes currently executed transaction quantities corresponding to accounts of the block chain network, and the transactions included in the on-chained blocks are all transactions that have been executed. Therefore, the transaction A2, the transaction A1, and the transaction B1 are all transactions that have been executed. Assuming that other blocks in the block chain 21 do not include transactions transmitted by the account A and the account B, the execution data 22 will record that the currently executed transaction quantity corresponding to the account A is 2, and the currently executed transaction quantity corresponding to the account B is 1.

As shown in FIG. 2, the block chain node 20 further includes a transaction pool 23. The transaction pool 23 is used for caching transactions received by the block chain node 20 but not on-chained to the block chain 21. It is assumed that the block chain node 20 now receives a transaction A5 transmitted by the account A and the transaction A5 includes an execution order identifier 4. The execution order identifier 4 indicates that the account A expects the transaction A5 to be a fifth executed transaction thereof in the block chain network, and if the execution order of the transaction A5 in the block chain network does not satisfy the execution order indicated by the execution order identifier 4, the transaction A5 would be considered as an invalid transaction, and the on-chaining of the block including the transaction A5 would fail. After receiving the transaction A5, the block chain node 20 temporarily stores it in the transaction pool 23. In order to enable the transaction A5 to be the fifth executed transaction transmitted by the account A in the block chain, the block chain node 20 will acquire an account ready queue 231 and an account waiting queue 232 corresponding to the account A. The account ready queue 231 is used for storing ready transactions in a prepared state. It is assumed that the account ready queue 231 includes a transaction A3 and an execution order identifier 2 corresponding to the transaction A3, and a transaction A4 and an execution order identifier 3 corresponding to the transaction A4. It is to be understood that the execution order of a ready transaction in the prepared state on the block chain will be the same as the execution order indicated by the corresponding execution order identifier thereof. Since the transaction A3 and the transaction A4 in the account ready queue 231 will be added to an aggregate ready queue 230 in an order of small to large execution order identifiers, where the aggregate ready queue 230 is used for storing transactions in account ready queues corresponding to all accounts in the block chain network, the block chain node 20 will pack the transactions into a block from the aggregate ready queue 230 in a transaction insertion time sequence. Therefore, during execution of the block, the transactions are also executed in a transaction insertion time sequence. That is, in the subsequent process of block packing and on-chaining by the block chain node 20, the transaction A3 is executed first, and then the transaction A4 is executed. Since the block chain node 20 has executed the transaction A1 and the transaction A2 transmitted by the account A, the transaction A3 will be a third executed transaction of the account A in the block chain network. The execution order of the transaction A3 is the same as the execution order indicated by the execution order identifier 2 of the transaction A3, so the transaction A3 is a ready transaction in a prepared state. Likewise, the transaction A4 will be a fourth executed transaction of the account A in the block chain network. The execution order of the transaction A4 is the same as the execution order indicated by the execution order identifier 3 of the transaction A4, and transaction A4 is also a ready transaction in a prepared state.

The account waiting queue 232 is used for storing waiting transactions in an unprepared state. Assuming that the account waiting queue 232 includes a transaction A6 and an execution order identifier 5 corresponding to the transaction A6, it can be seen that the account A expects the transaction A6 to be a sixth executed transaction thereof in the block chain network. However, if the transaction A3, the transaction A4, and the transaction A6 are packed into a block at this time, the transaction A6 will be a fifth executed transaction of the account A in the block chain network, and the execution order of the transaction A6 is different from the execution order indicated by the execution order identifier 5 corresponding to the transaction A6, so the transaction A6 is a waiting transaction in an unprepared state.

As shown in FIG. 2, the block chain node 20 will determine whether the transaction A5 is in a prepared state. The block chain node 20 will query the account ready queue 231 to determine that the maximum execution order identifier included therein is the execution order identifier 3. The execution order identifier 3 and the execution order identifier 4 corresponding to the transaction A5 satisfy a continuous order relationship. If the transaction A5 is executed following the transaction A4, the transaction A5 will be the fifth executed transaction of the account A in the block chain network. Therefore, the block chain node 20 can determine that the execution order of the transaction A5 is the same as the execution order indicated by the corresponding execution order identifier 4 thereof, and then the transaction A5 is in the prepared state. Therefore, the block chain node 20 will add the transaction A5 and the execution order identifier 4 corresponding to the transaction A5 together to the account ready queue 231 of the account A to obtain a transitional account ready queue (not shown). After adding the transaction A5 and the execution order identifier 4 corresponding to the transaction A5 to the account ready queue 231 of the account A, the block chain node 20 may perform an upgrade on the transactions in the account waiting queue 232, i.e., determining whether a transaction that can be executed in an execution order executed by a corresponding execution order identifier thereof is present after the transaction A5 becomes the fifth executed transaction of the account A in the block chain network, and migrating the transaction, if present, from the account waiting queue 232 to the account ready queue 231. As shown in FIG. 2, the execution order identifier 6 corresponding to the transaction A6 and the execution order identifier 5 corresponding to the transaction A5 can form a continuous sequence of order identifiers. Therefore, the block chain node 20 will migrate the transaction A6 and the execution order identifier 5 corresponding to the transaction A6 to the transitional account ready queue, obtaining an upgraded account ready queue 234 and an upgraded account waiting queue 235. Finally, the block chain node 20 will add the transaction A5 and the transaction A6 to the account aggregate ready queue 230.

With the data processing method provided in the embodiment of this application, refined management is performed on the transactions of the block chain node temporarily stored in the transaction pool in a dimension of account. The execution orders of the transactions packed into the block are ensured to be the same as the execution orders indicated by the execution order identifiers included therein, so as to improve the probability for passing a consensus of the block, thereby improving the success rate of block on-chaining.

Figure 3:
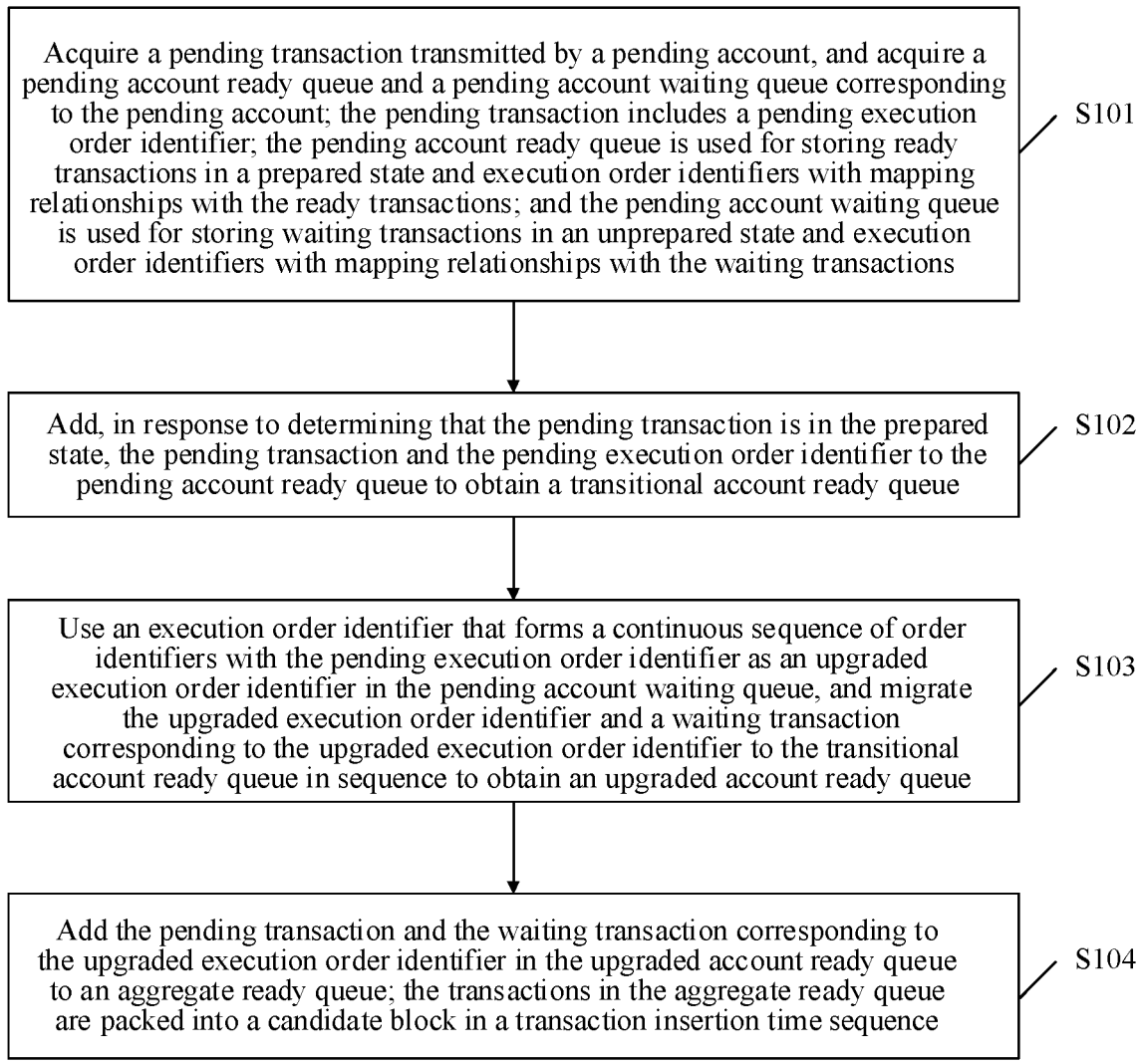
FIG. 3 is a flow diagram of a block chain-based data processing method according to an embodiment of this application.

Reference is made to FIG. 3 which is a flow diagram of a block chain-based data processing method according to an embodiment of this application. The method can be performed by a block chain node (for example, any block chain node in the block chain node system in the above embodiments corresponding to FIG. 1). The method is exemplified as being performed by a block chain node below. The block chain-based data processing method may include at least the following steps S101-S104:

S101: Acquire a pending transaction transmitted by a pending account, and acquire a pending account ready queue and a pending account waiting queue corresponding to the pending account: the pending transaction includes a pending execution order identifier; the pending account ready queue is used for storing ready transactions in a prepared state and execution order identifiers with mapping relationships with the ready transactions; and the pending account waiting queue is used for storing waiting transactions in an unprepared state and execution order identifiers with mapping relationships with the waiting transactions.

The execution order identifier refers to a txNonce corresponding to the transaction, and is used for identifying an execution order that the account transmitting the transaction expects for the transaction in the transactions transmitted by the account, and it is incremented from 0). For example, if an execution order identifier corresponding to a transaction C3 transmitted by an account C is 2, the account C expects that the transaction C3 is a third executed transaction thereof in the block chain network, and after the transaction C3 is executed, the currently executed transaction quantity of the account C is 3. Therefore, it is to be understood that a next executed transaction of the account C shall be a transaction C4 with an execution order identifier of 3.

The transactions which are received by the block chain node but not packed into the block are stored in the transaction pool, and the block chain node may cache transactions in a dimension of account. For example, the transactions of the pending account are further divided into ready transactions in the prepared state and waiting transactions in the unprepared state. Then the ready transactions in the prepared state and corresponding execution order identifiers thereof are added to the pending account ready queue, and the waiting transactions in the unprepared state and corresponding execution order identifiers thereof are added to the pending account waiting queue. The ready transactions being in the prepared state means that, if all the transactions of the pending account in the transaction pool are executed in an order of small to large execution order identifiers, the execution orders of the ready transactions in all the transactions (including the transactions in the transaction pool and transactions that have been on-chained) transmitted to the block chain network from the pending account will be the same as the execution orders indicated by corresponding execution order identifiers thereof. The waiting transactions being in the unprepared state means that, if all the transactions of the pending account in the transaction pool are executed in an order of small to large execution order identifiers, the execution orders of the waiting transactions in all the transactions (including the transactions in the transaction pool and transactions that have been on-chained) transmitted to the block chain network from the pending account will be different from the execution orders indicated by corresponding execution order identifiers thereof. Of course, the transactions in the block chain node need to be packed into a candidate block, and the transactions in the candidate block can only be executed after a consensus is passed for the candidate block.

The block chain node, when packing the transactions, acquires transactions from an aggregate ready queue in a transaction insertion time sequence and packs them to generate the candidate block. The aggregate ready queue includes ready transactions in account ready queues corresponding to all accounts in the block chain network, although the transactions in the ready transactions of the same account are added to the aggregate ready queue based on an order of execution order identifiers thereof in the account ready queue. Therefore, the block chain node only needs to ensure that the ready transactions in the pending account ready queue can be arranged in an order of small to large execution order identifiers, and that the minimum execution order identifier in the pending account ready queues is equal to the currently executed transaction quantity corresponding to the pending account in the current world status, i.e., the accountNonce corresponding to the pending account, so that when the ready transactions are executed after being packed into the candidate block, the execution orders of the ready transactions in all the transactions transmitted to the block chain network from the pending account are the execution orders indicated by execution order identifiers thereof. For example, an accountNonce of an account D is 3, which represents that three transactions of the account D have been executed by the block chain node, and an account ready queue corresponding to the account D includes a transaction D4 and an execution order identifier 3 corresponding to the transaction D4, and a transaction D5 and an execution order identifier 4 corresponding to the transaction D5. The block chain node will then add the transaction D4 and the transaction D5 to an aggregate ready queue in an order of small to large execution order identifiers. Then the block chain node will pack the transaction D4 to a candidate block firstly and the transaction D5 into the candidate block secondly in a transaction insertion time sequence. The block chain node will subsequently execute the transaction D4 and the transaction D5 successively, where the transaction D4 will be a fourth executed transaction of the account D, and the transaction D5 will be a fifth executed transaction of the account D, and the execution orders corresponding to the transaction D4 and the transaction D5 comply with the execution orders indicated by corresponding execution order identifiers thereof.

S102: Add, in response to determining that the pending transaction is in the prepared state, the pending transaction and the pending execution order identifier to the pending account ready queue to obtain a transitional account ready queue.

After receiving the pending transaction, the block chain node may determine whether the pending transaction is in the prepared state based on the currently executed transaction quantity of the pending account or based on a relationship between the execution order identifier of the pending transaction and the execution order identifiers in the pending account ready queue. If the pending transaction is in the prepared state, the pending transaction and the execution order identifier corresponding to the pending transaction are added directly to the pending account ready queue to obtain a transitional account ready queue. If the pending transaction is in the unprepared state, the pending transaction and the pending execution order identifier are added to the pending account waiting queue.

In a possible implementation, when the pending account ready queue does not include a ready transaction, i.e., the pending account ready queue is an empty queue, a feasible process of determining whether the pending transaction is in the prepared state may include: comparing the pending execution order identifier with the currently executed transaction quantity of the pending account: determining, in response to the pending execution order identifier and the currently executed transaction quantity of the pending account being the same, that the pending transaction is in the prepared state; and determining, in response to the pending execution order identifier and the currently executed transaction quantity of the pending account being different, that the pending transaction is in the unprepared state, and adding the pending transaction and the pending execution order identifier to the pending account waiting queue. For example, when an accountNonce of an account E is 3 and an account ready queue corresponding to the account E is an empty queue, the block chain node receives a transaction D5 including an execution order identifier 4 transmitted by the account E, which indicates that the account E expects the transaction D5 to be a fifth executed transaction thereof. If the transaction D5 is added to the account ready queue, the transaction D5 will become a fourth executed transaction of the account E, which is inconsistent with the execution order expected by the account E. Therefore, the transaction D5 is a waiting transaction in an unprepared state, and the transaction D5 is to be added to the account waiting queue to wait for an upgrade.

In another possible implementation, when the pending account ready queue includes ready transactions, i.e., the pending account ready queue is a non-empty queue, a feasible process of determining whether the pending transaction is in the prepared state may include: determining, in response to the pending account ready queue being the non-empty queue, an identifier relationship between the pending execution order identifier and a maximum execution order identifier in the pending account ready queue: determining, in response to the identifier relationship satisfying a continuous order relationship, that the pending transaction is in the prepared state; and determining, in response to the identifier relationship not satisfying the continuous order relationship, that the pending transaction is in the unprepared state, and adding the pending transaction and the pending execution order identifier to the pending account waiting queue. It is to be understood that the ready transactions in the pending account ready queue are all in the prepared state, i.e., the ready transactions can all be executed in the execution orders indicated by execution order identifiers thereof. If the maximum execution order identifier in the pending account ready queue is an execution order identifier 5, the ready transaction corresponding to the execution order identifier 5 will be a sixth executed transaction of the pending account. If the pending transaction is added to the pending account ready queue, it will become a seventh executed transaction of the pending account, and therefore the execution order identifier of the pending transaction is to be an execution order identifier 6. That is, the execution order identifier of the pending transaction is to be in a continuous order relationship with the execution order identifier 5, so that the pending transaction can be executed in the execution order indicated by the execution order identifier thereof.

S103: Use an execution order identifier that forms a continuous sequence of order identifiers with the pending execution order identifier as an upgraded execution order identifier in the pending account waiting queue, and migrate the upgraded execution order identifier and a waiting transaction corresponding to the upgraded execution order identifier to the transitional account ready queue in sequence to obtain an upgraded account ready queue.

When the pending transaction is added to the account ready queue to obtain the transitional account ready queue, the maximum execution order identifier in the transitional account ready queue is the pending execution order identifier corresponding to the pending transaction. At this point, the block chain node can query the pending account waiting queue, and use the execution order identifier that forms a continuous sequence of order identifiers with the pending execution order identifier as the upgraded execution order identifier, and migrate the upgraded execution order identifier and the waiting transaction corresponding to the upgraded execution order identifier to the transitional account ready queue in sequence to obtain the upgraded account ready queue. It is to be understood that the execution order identifiers in the upgraded account ready queue may form a continuous sequence of order identifiers beginning with the currently executed transaction quantity of the pending account.

S104: Add the pending transaction and the waiting transaction corresponding to the upgraded execution order identifier in the upgraded account ready queue to an aggregate ready queue: the transactions in the aggregate ready queue are packed into a candidate block in a transaction insertion time sequence.

The block chain network includes at least two accounts, and each account corresponds to an account ready queue and an account waiting queue. The block chain node adds a new ready transaction to the aggregate ready queue while adding it to an account ready queue corresponding to an account. The block chain node, when packing the candidate block, acquires transactions from the aggregate ready queue in a transaction insertion time sequence. The transaction insertion time sequence refers to a time sequence in which the transactions are added to the aggregate ready queue.

In a possible implementation, the block chain node may further include an aggregate transaction queue which is used for recording all transactions in the transaction pool. That is, the aggregate transaction queue may include ready transactions and waiting transactions corresponding to all accounts in the block chain network, so as to facilitate the block chain node to perform overall query management on the transaction pool. In addition, the block chain node may further include an account ready queue Hash mapping and an account waiting queue Hash mapping, where the account ready queue Hash mapping is used for the block chain node to search for the account ready queue corresponding to the account, and the account waiting queue Hash mapping is used for the block chain node to search for the account waiting queue corresponding to the account.

Figure 4:
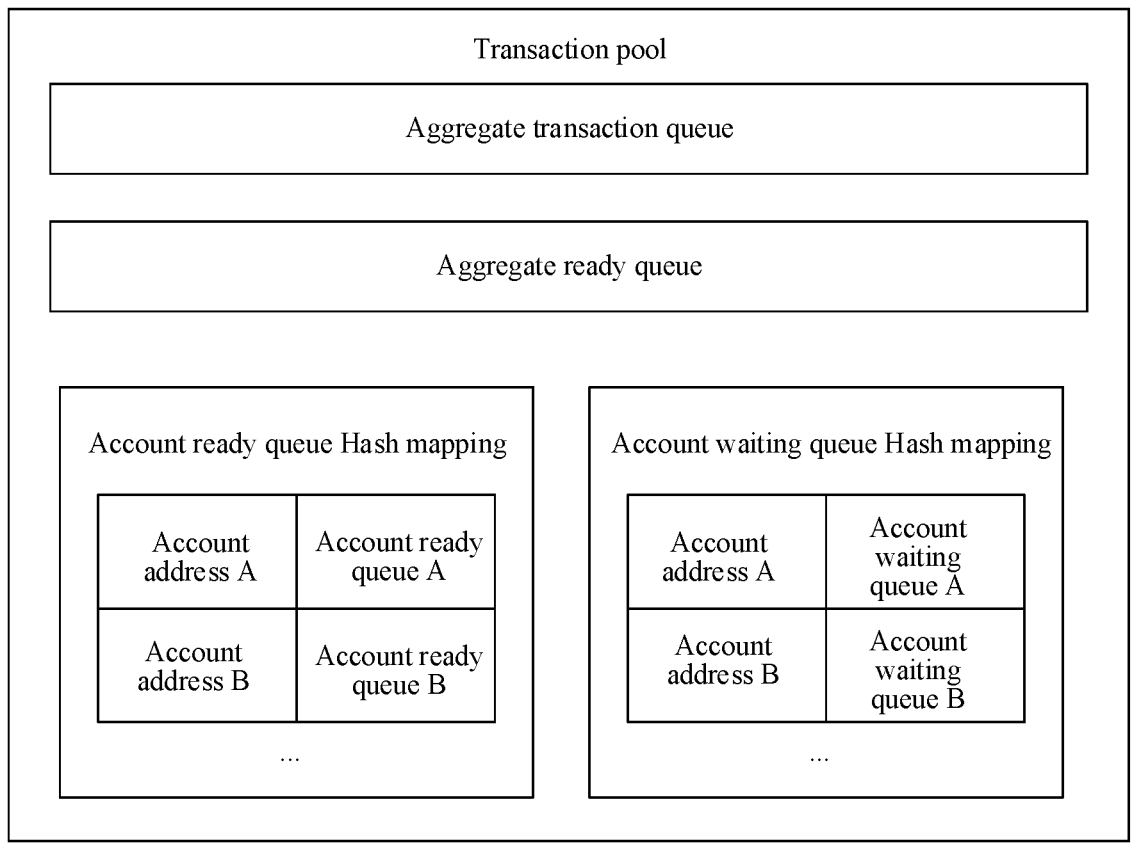
FIG. 4 is a schematic diagram of queue construction for transaction pool management according to an embodiment of this application.

In order to facilitate understanding, reference is made to FIG. 4 which is a schematic diagram of queue construction for transaction pool management according to an embodiment of this application. As shown in FIG. 4, based on the transactions in the transaction pool, the block chain node may construct an aggregate queue including all transactions of the whole transaction pool and an aggregate ready queue for storing ready transactions in the prepared state of all accounts. The block chain node may also construct an account ready queue and an account waiting queue corresponding to each account, and establish an account ready queue Hash mapping from an account address to the account ready queue and an account waiting queue Hash mapping from the account address to the account waiting queue. The account address is a unique address of the account.

As shown in FIG. 4, the aggregate transaction queue may include transactions and transaction Hashes with mapping relationships with the transactions, so the aggregate transaction queue may use a HashMap structure that maps from the transaction Hashes to the transactions. A transaction Hash is a unique identifier of a transaction. HashMap is a key-value mapping structure, and the traversal order is random access. The aggregate ready queue may include transactions and transaction Hashes with mapping relationships with the transactions. The block chain node is allowed to store transactions and traverse in a transaction insertion time sequence, so the aggregate ready queue may use a LinkedHashMap structure that maps from the transaction Hashes to the transactions, and store transactions in an insertion time sequence. LinkedHashMap is a key-value mapping structure, which performs an ordered storage and traversal in an insertion time sequence. The account ready queue needs to include ready transactions and txNonces with mapping relationships with the ready transactions, and the account waiting queue needs to include waiting transactions and txNonces with mapping relationships with the waiting transactions. The block chain node is allowed to store transactions and traverse in an order of small to large txNonces. Therefore, both the account ready queue and the account waiting queue can use a TreeMap structure mapping from the txNonces to the transactions, and store the transactions in an order of small to large txNonce fields. TreeMap is a key-value mapping structure, which performs an ordered storage and traversal based on the sizes of keys. The account ready queue Hash mapping may use the HashMap structure from the account address to the account ready queue, and the account waiting queue Hash mapping may use the HashMap structure from the account address to the account waiting queue. From the list shown in FIG. 4, it is seen that a specified transaction in the account ready queue or the account waiting queue can be quickly positioned as long as the block chain node knows the txNonce of the pending transaction and the account address of the account transmitting the pending transaction. The same transaction may logically appear in the aggregate transaction queue, the aggregate ready queue, or the account ready queue or the account waiting queue simultaneously, but physically refer to an internal memory pointer of the transaction, and physically the data of the transaction will only be stored in the internal memory in one copy, thereby saving the internal memory. Therefore, whenever embodiments of this application describe a transaction as being in a queue, the internal memory pointer for the transaction may be referred to as being in the queue, which will not be repeated.

With the method provided in the embodiment of this application, all of the ready transactions in the prepared state of the pending account are stored in the pending account ready queue, and only the ready transactions of the pending account can be added to the aggregate ready queue, so as to ensure that waiting transactions in the unprepared state do not occur in the candidate block generated based on transaction packing in the aggregate ready queue, thus improving the success rate of block on-chaining. In addition, transactions in the unprepared state transmitted by the pending account will not be rejected, but temporarily stored in the pending account waiting queue. Whenever a new transaction in the prepared state of the pending account is added to the pending account ready queue, the pending account waiting queue is upgraded, and a qualified waiting transaction will be added to the pending account ready queue and further added to the aggregate ready queue for packing, thereby increasing the error tolerance of the block chain system.

Figure 5:
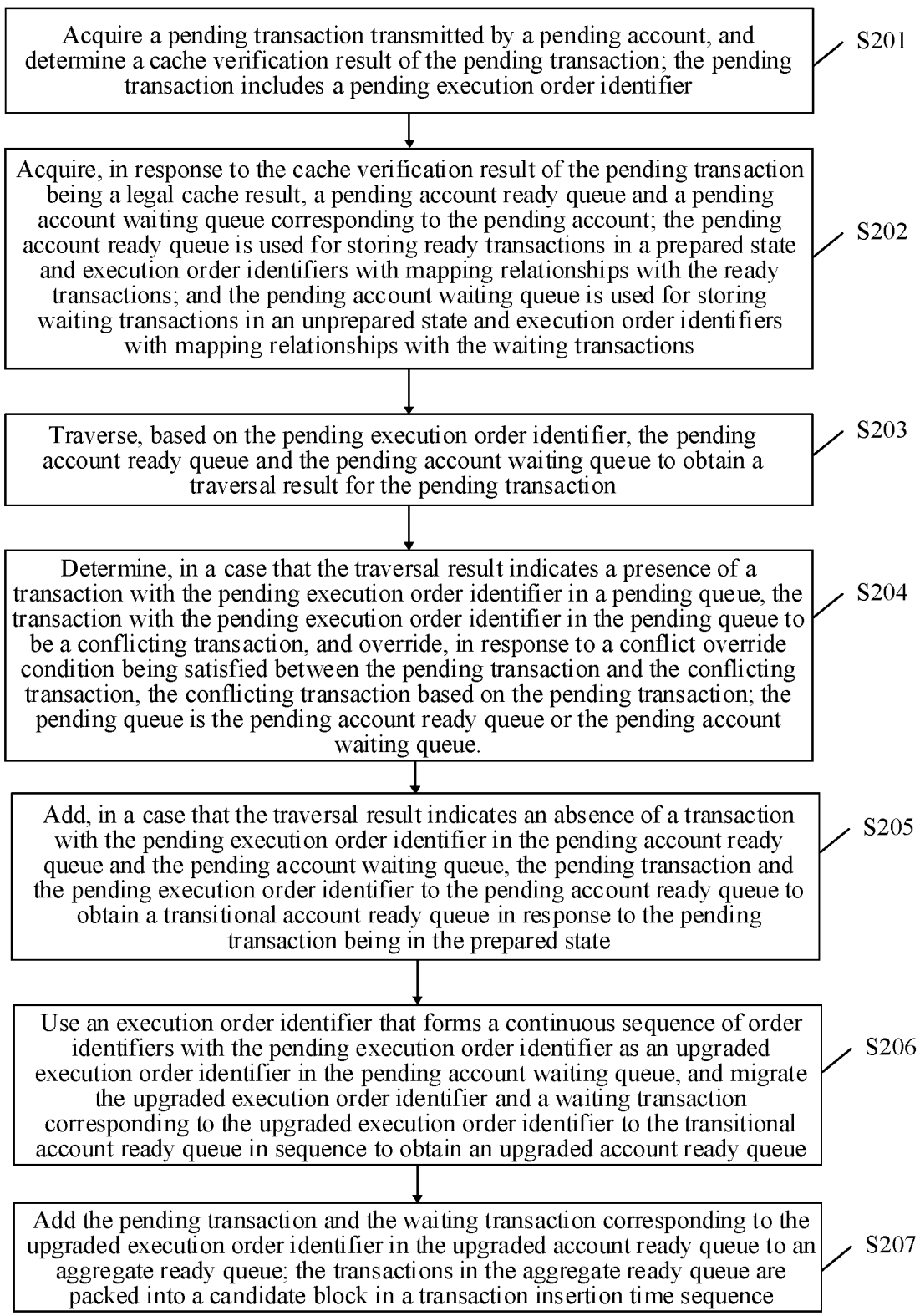
FIG. 5 is a flow diagram of a block chain-based data processing method according to an embodiment of this application.

Reference is made to FIG. 5 which is a flow diagram of a block chain-based data processing method according to an embodiment of this application. The method can be performed by a block chain node (for example, any block chain node in the block chain node system in the above embodiments corresponding to FIG. 1). The method is exemplified as being performed by a block chain node below. The block chain-based data processing method may include at least the following steps 201-S207:

S201: Acquire a pending transaction transmitted by a pending account, and determine a cache verification result of the pending transaction: the pending transaction includes a pending execution order identifier.

After receiving the pending transaction transmitted by the pending account, a block chain node may first determine the cache verification result of the pending transaction. If the block chain node determines that the cache verification result of the pending transaction is a legal cache result, the pending transaction may be cached into a transaction pool. If the block chain node determines that the cache verification result of the pending transaction is an illegal cache result, the block chain node may directly return error information to the pending account.

In a possible implementation, a feasible implementation for determining the cache verification result of the pending transaction may include: acquiring an aggregate transaction quantity in an aggregate transaction queue: acquiring an aggregate transaction quantity upper limit threshold: returning, in response to the aggregate transaction quantity being equal to the aggregate transaction quantity upper limit threshold, transaction upper limit error information to the pending account; and determining, in response to the aggregate transaction quantity being less than the aggregate transaction quantity upper limit threshold, that the cache verification result of the pending transaction is the legal cache result. The aggregate transaction quantity is the quantity of transactions included in the aggregate transaction queue, i.e., the quantity of transactions cached in the transaction pool. It is to be understood that the capacity of the transaction pool is limited, and when the cached transactions in the transaction pool reach the upper limit, the block chain node can no longer add a pending transaction to the transaction pool, and the block chain node can only transmit transaction upper limit error information to the pending account. In addition, the upper capacity limit of the transaction pool may be configured by the configuration module of the block chain node.

In another possible implementation, a feasible implementation for determining the cache verification result of the pending transaction may include: acquiring an account transaction quantity upper limit threshold: transmitting, in response to a sum of a quantity of the ready transactions and a quantity of the waiting transactions being equal to the account transaction quantity upper limit threshold, transaction upper limit error information to the pending account; and determining, in response to a sum of a quantity of the ready transactions and a quantity of the waiting transactions being less than the account transaction quantity upper limit, that the cache verification result of the pending transaction is the legal cache result. The account transaction quantity upper limit threshold refers to a maximum transaction quantity that the pending account can cache in the transaction pool, and can be configured by the configuration module of the block chain node. It is to be understood that the transactions of the pending account cached in the transaction pool include ready transactions and waiting transactions. When the transactions of the pending account cached in the transaction pool reach the upper limit, the block chain node, when receives a pending transaction transmitted by the pending account, will not cache the pending transaction, but return transaction upper limit error information to the pending account, although the transactions cached in the transaction pool of the block chain node do not reach an upper limit.

In yet another possible implementation, a feasible implementation for determining the cache verification result of the pending transaction may include: acquiring a currently executed transaction quantity of the pending account: transmitting, in response to the pending execution order identifier being less than the currently executed transaction quantity, transaction time-out error information to the pending account; and determining, in response to the pending execution order identifier being greater than or equal to the currently executed transaction quantity, that the cache verification result of the pending transaction is the legal cache result. It is to be understood that when the currently executed transaction quantity of the pending account is greater than the pending execution order identifier of the pending transaction, the pending transaction may not be executed in the execution order indicated by the pending execution order identifier, and the block chain node may not store and execute the pending transaction.

In yet another possible implementation, a feasible implementation for determining the cache verification result of the pending transaction may include: acquiring a transaction execution overhead of the pending transaction, and querying an account resource of the pending account: transmitting, in response to the account resource being less than the transaction execution overhead, resource shortage error information to the pending account; and determining, in response to the account resource being greater than or equal to the transaction execution overhead, that the cache verification result of the pending transaction is the legal cache result. The transaction execution overhead refers to the digital resource that the pending account is willing to provide for executing the transaction, and the account resource refers to the digital resource owned by the pending account in the block chain network.

The block chain node may perform the above feasible implementations simultaneously on the pending transaction to determine the cache verification result of the pending transaction. The pending transaction needs to satisfy the verifications of the feasible implementations, so that and the block chain node can determine that the cache verification result of the pending transaction is the legal cache result.

S202: Acquire, in response to the cache verification result of the pending transaction being the legal cache result, a pending account ready queue and a pending account waiting queue corresponding to the pending account: the pending account ready queue is used for storing ready transactions in a prepared state and execution order identifiers with mapping relationships with the ready transactions; and the pending account waiting queue is used for storing waiting transactions in an unprepared state and execution order identifiers with mapping relationships with the waiting transactions.

The implementation of S202 can refer to S101 in the above embodiments corresponding to FIG. 3, which will not be repeated.

S203: Traverse, based on the pending execution order identifier, the pending account ready queue and the pending account waiting queue to obtain a traversal result for the pending transaction.

There is an interval between the pending account transmitting a transaction carrying an execution order identifier and the transaction being packed into a candidate block. In this interval, if the pending account expects to execute another transaction in an execution order indicated by the execution order identifier, the pending account may transmit the other transaction also including the execution order identifier to the block chain node. Therefore, the block chain node may acquire a plurality of transactions with the same execution order identifier. However, the block chain node will only select an optimal transaction or a transaction most desired by the pending account from the plurality of transactions with the same execution order identifier for execution, and the remaining transactions will be discarded. Therefore, after receiving the pending transaction, the block chain node needs to determine whether the pending account ready queue corresponding to the pending account already includes a ready transaction with the pending execution order identifier, or whether the pending account waiting queue already includes a waiting transaction with the pending execution order identifier.

S204: Determine, when the traversal result indicates a presence of a transaction with the pending execution order identifier in a pending queue, the transaction with the pending execution order identifier in the pending queue to be a conflicting transaction, and override, in response to a conflict override condition being satisfied between the pending transaction and the conflicting transaction, the conflicting transaction based on the pending transaction: the pending queue is the pending account ready queue or the pending account waiting queue.

The conflicting transaction and the pending transaction have the same pending execution order identifier. The block chain node needs to determine whether the conflict override condition is satisfied between the pending transaction and the conflicting transaction. In response to the conflict override condition being satisfied between the pending transaction and the conflicting transaction, the conflicting transaction is overridden based on the pending transaction. In response to the conflict override condition being not satisfied between the pending transaction and the conflicting transaction, the block chain node discards the pending transaction.

In a possible implementation, a feasible implementation for the block chain node to determine whether the conflict override condition is satisfied between the pending transaction and the conflicting transaction may include: acquiring a transaction execution overhead of the pending transaction, and acquiring a transaction execution overhead of the conflicting transaction: determining, in response to the transaction execution overhead of the pending transaction being greater than the transaction execution overhead of the conflicting transaction, that the conflict override condition is satisfied between the pending transaction and the conflicting transaction; and determining, in response to the transaction execution overhead of the pending transaction being less than or equal to the transaction execution overhead of the conflicting transaction, that the conflict override condition is not satisfied between the pending transaction and the conflicting transaction, and transmitting transaction override failure error information to the pending account. The transaction execution overhead refers to the digital resource that the pending account is willing to provide for the block chain network to execute the transaction. Therefore, a transaction with a greater transaction execution overhead is a transaction that the pending account is more willing to execute. At this point, the block chain node will use the pending transaction to override the conflicting transaction.

In a possible implementation, a feasible implementation for overriding the conflicting transaction based on the pending transaction may include: replacing, in response to the pending queue being the pending account ready queue, the conflicting transaction with the pending transaction in the pending account ready queue, and the conflicting transaction with the pending transaction in the aggregate ready queue; and replacing, in response to the pending queue being the pending account waiting queue, the conflicting transaction with the pending transaction in the pending account waiting queue. In addition, the block chain node may delete the conflicting transaction in the transaction pool.

S205: Add, when the traversal result indicates an absence of a transaction with the pending execution order identifier in the pending account ready queue and the pending account waiting queue, the pending transaction and the pending execution order identifier to the pending account ready queue to obtain a transitional account ready queue in response to the pending transaction being in the prepared state.

S206: Use an execution order identifier that forms a continuous sequence of order identifiers with the pending execution order identifier as an upgraded execution order identifier in the pending account waiting queue, and migrate the upgraded execution order identifier and a waiting transaction corresponding to the upgraded execution order identifier to the transitional account ready queue in sequence to obtain an upgraded account ready queue.

S207: Add the pending transaction and the waiting transaction corresponding to the upgraded execution order identifier in the upgraded account ready queue to an aggregate ready queue: the transactions in the aggregate ready queue are packed into a candidate block in a transaction insertion time sequence.

The specific implementations of S205-S207 can refer to S102-S104 in the above embodiments corresponding to FIG. 3, which will not be repeated.

With the method provided in the embodiment of this application, a pending account, after transmitting a transaction with a pending execution order identifier, can transmit a pending transaction with the same pending execution order identifier with a higher transaction execution overhead, so as to override the previously transmitted transaction, improving the use flexibility of the block chain. The previously transmitted transaction is replaced with the pending transaction in a queue including the previously transmitted transaction, without disturbing the pending execution orders of remaining transactions, improving the effectiveness of transaction packing.

Figure 6:
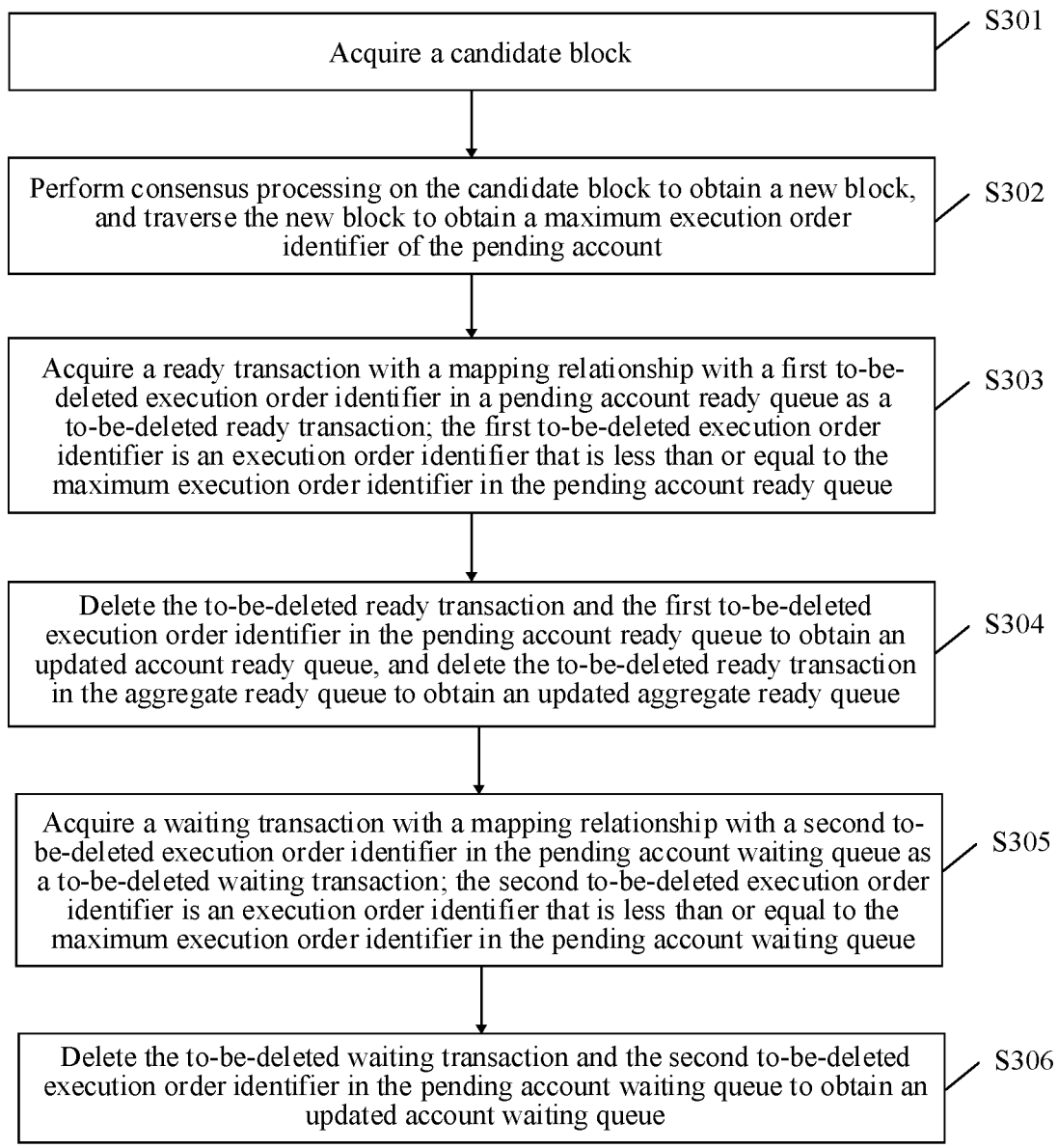
FIG. 6 is a flow diagram of a block chain-based data processing method according to an embodiment of this application.

Reference is made to FIG. 6 which is a flow diagram of a block chain-based data processing method according to an embodiment of this application. The method can be performed by a block chain node (for example, any block chain node in the block chain node system in the above embodiments corresponding to FIG. 1). The method is exemplified as being performed by a block chain node below. The block chain-based data processing method may include at least the following steps 301-S306:

S301: Acquire a candidate block.

The candidate block may be generated by a block chain node or generated by another block chain node and then broadcast to the block chain node. The block chain node, with a block generation authority, can acquire transactions from an aggregate ready queue in a transaction insertion time sequence which are then packed successively to generate the candidate block. The transaction quantity in the block needs to be less than or equal to a block transaction quantity threshold, where the block transaction quantity threshold refers to a maximum transaction quantity that may be included in the block, which may be configured by the configuration module.

S302: Perform consensus processing on the candidate block to obtain a new block, and traverse the new block to obtain a maximum execution order identifier of the pending account.

The block chain node can perform consensus processing on the candidate block together with other consensus nodes. After the consensus is passed, the candidate block is executed, i.e., all transactions in the candidate block are executed, so as to obtain the new block including all transactions and transaction execution results corresponding to all transactions. The new block will be inserted into the existing block chain structure to obtain a new block chain, and account resources corresponding to accounts in the new block chain will also be changed. Therefore, a new world status is obtained.

A transaction that has been executed and written into the block chain is to be deleted from a transaction pool, and accordingly also deleted from an account ready queue and an account waiting queue corresponding to the account transmitting the transaction. The block chain node may still delete transactions in a dimension of account, i.e., determining a maximum execution order identifier corresponding to each account based on the transactions in the block, and then deleting ready transactions and waiting transactions of each account. With a pending account as an example, it is assumed that the block chain node traverses the block to obtain a maximum execution order identifier of the pending account.

S303: Acquire a ready transaction with a mapping relationship with a first to-be-deleted execution order identifier in a pending account ready queue as a to-be-deleted ready transaction: the first to-be-deleted execution order identifier is an execution order identifier that is less than or equal to the maximum execution order identifier in the pending account ready queue.

The block chain node may acquire the pending account ready queue corresponding to the pending account, search for an execution order identifier that is less than or equal to the maximum execution order identifier from the pending account ready queue, and use the found execution order identifier as the first to-be-deleted execution order identifier. Then the block chain node may use the ready transaction with the mapping relationship with the first to-be-deleted execution order identifier in the pending account ready queue as the to-be-deleted ready transaction.

S304: Delete the to-be-deleted ready transaction and the first to-be-deleted execution order identifier in the pending account ready queue to obtain an updated account ready queue, and delete the to-be-deleted ready transaction in the aggregate ready queue to obtain an updated aggregate ready queue.

After determining the to-be-deleted ready transaction, the block chain node may delete the to-be-deleted ready transaction and the first to-be-deleted execution order identifier in the pending account ready queue to obtain the updated account ready queue, and delete the to-be-deleted ready transaction in the aggregate ready queue to obtain the updated aggregate ready queue.

S305: Acquire a waiting transaction with a mapping relationship with a second to-be-deleted execution order identifier in the pending account waiting queue as a to-be-deleted waiting transaction: the second to-be-deleted execution order identifier is an execution order identifier that is less than or equal to the maximum execution order identifier in the pending account waiting queue.

The block chain node may acquire the pending account waiting queue corresponding to the pending account, search for an execution order identifier that is less than or equal to the maximum execution order identifier from the pending account waiting queue, and use the found execution order identifier as the second to-be-deleted execution order identifier. Then the block chain node may use the waiting transaction with the mapping relationship with the second to-be-deleted execution order identifier in the pending account waiting queue as the to-be-deleted waiting transaction.

S306: Delete the to-be-deleted waiting transaction and the second to-be-deleted execution order identifier in the pending account waiting queue to obtain an updated account waiting queue.

After determining the to-be-deleted waiting transaction, the block chain node may delete the to-be-deleted waiting transaction and the second to-be-deleted execution order identifier in the pending account waiting queue to obtain the updated account waiting queue.

In a possible implementation, after deleting the transaction that has been executed, the block chain node may upgrade the updated account waiting queue, i.e., determining whether a preparation state of a waiting transaction in the updated account waiting queue is changed, and migrating the waiting transaction transitioned to the prepared state from the updated account waiting queue to the updated account ready queue. One feasible implementation for the upgrade may include: the block chain node acquiring a minimum execution order identifier in the updated account waiting queue: generating an optimized execution order identifier base on the maximum execution order identifier: using, in response to the minimum execution order identifier being equal to the optimized execution order identifier, an execution order identifier that forms a continuous sequence of order identifiers with the minimum execution order identifier as an optimized upgraded execution order identifier in the pending account waiting queue, and migrating the minimum execution order identifier, a waiting transaction corresponding to the minimum execution order identifier, the optimized upgraded execution order identifier, and a waiting transaction corresponding to the optimized upgraded execution order identifier to the updated account ready queue in sequence to obtain an optimized upgraded account ready queue; and adding the minimum execution order identifier, the waiting transaction corresponding to the minimum execution order identifier, the optimized upgraded execution order identifier, and the waiting transaction corresponding to the optimized upgraded execution order identifier to the updated aggregate ready queue to obtain an optimized upgraded aggregate ready queue. The process of generating the optimized execution order identifier based on the maximum execution order identifier includes: obtaining the optimized execution order identifier by adding the maximum execution order identifier by one.

In order to facilitate understanding, it is assumed that a maximum execution order identifier of an account A included in the new block is an execution order identifier 6, so an optimized execution order identifier is an execution order identifier 7. It is assumed that after deleting an execution order identifier which is not greater than the maximum execution order identifier and a corresponding transaction thereof in an account waiting queue by the block chain node, the obtained updated account waiting queue includes a transaction 7 and an execution order identifier 7 corresponding to the transaction 7, a transaction 8 and an execution order identifier 8 corresponding to the transaction 8, and a transaction 10 and an execution order identifier 10 corresponding to the transaction 10. It is seen that the execution order identifier corresponding to the transaction 7 and the optimized execution order identifier, the execution order identifier 7, and the execution order identifier 8 can form a continuous sequence of order identifiers. Therefore, the block chain node will use the execution order identifier 8 as an optimized upgraded execution order identifier, and then migrate the transaction 7, the execution order identifier 7 corresponding to the transaction 7, the transaction 8, and the execution order identifier 8 corresponding to the transaction 8 to an updated account ready queue in sequence.

In a possible implementation, after deleting the transaction that has been executed, the block chain node may delete a ready transaction with a balance shortage, That is, the block chain node may execute the following steps: acquiring a ready transaction corresponding to the minimum execution order identifier in the updated account ready queue as a to-be-checked ready transaction: acquiring a transaction execution overhead of the to-be-checked ready transaction: querying an account resource of the pending account: deleting, in response to the transaction execution overhead of the to-be-checked ready transaction being greater than the account resource, the to-be-checked ready transaction and the minimum execution order identifier from the updated account ready queue, and deleting the to-be-checked ready transaction from the updated aggregate ready queue: using an execution order identifier greater than the minimum execution order identifier as a degraded execution order identifier in an updated account ready queue with deletion, and migrating the degraded execution order identifier and a ready transaction corresponding to the degraded execution order identifier to the updated account waiting queue to obtain a degraded account waiting queue: deleting the degraded execution order identifier and the ready transaction corresponding to the degraded execution order identifier from the updated account ready queue with deletion; and deleting the degraded execution order identifier and the ready transaction corresponding to the degraded execution order identifier from an updated aggregate ready queue with deletion. For a next time the transactions in the updated account ready queue are packed into a candidate block, the ready transaction corresponding to the minimum execution order identifier will be a first executed transaction of the pending account in the candidate block. If the digital resource of the pending account is short for affording the transaction execution overhead required by the ready transaction corresponding to the minimum execution order identifier, the candidate block will fail in consensus. Therefore, the block chain node can first check the ready transaction corresponding to the minimum execution order identifier, and if the pending account has a balance shortage, the ready transaction corresponding to the minimum execution order identifier is deleted. If other transactions in the updated account ready queue are packed into the candidate block, they cannot be executed in execution orders indicated by corresponding execution order identifiers thereof, and the block chain node can therefore first migrate the other transactions in the updated account ready queue back to the account waiting queue for waiting.

With the method provided in the embodiment of this application, the time consumption of a refresh operation on a transaction pool, during addition of a new block, is not affected by the size of the transaction pool, but only related to the size of the block, thereby improving the efficiency of the refresh operation on the transaction pool.

Figure 7:
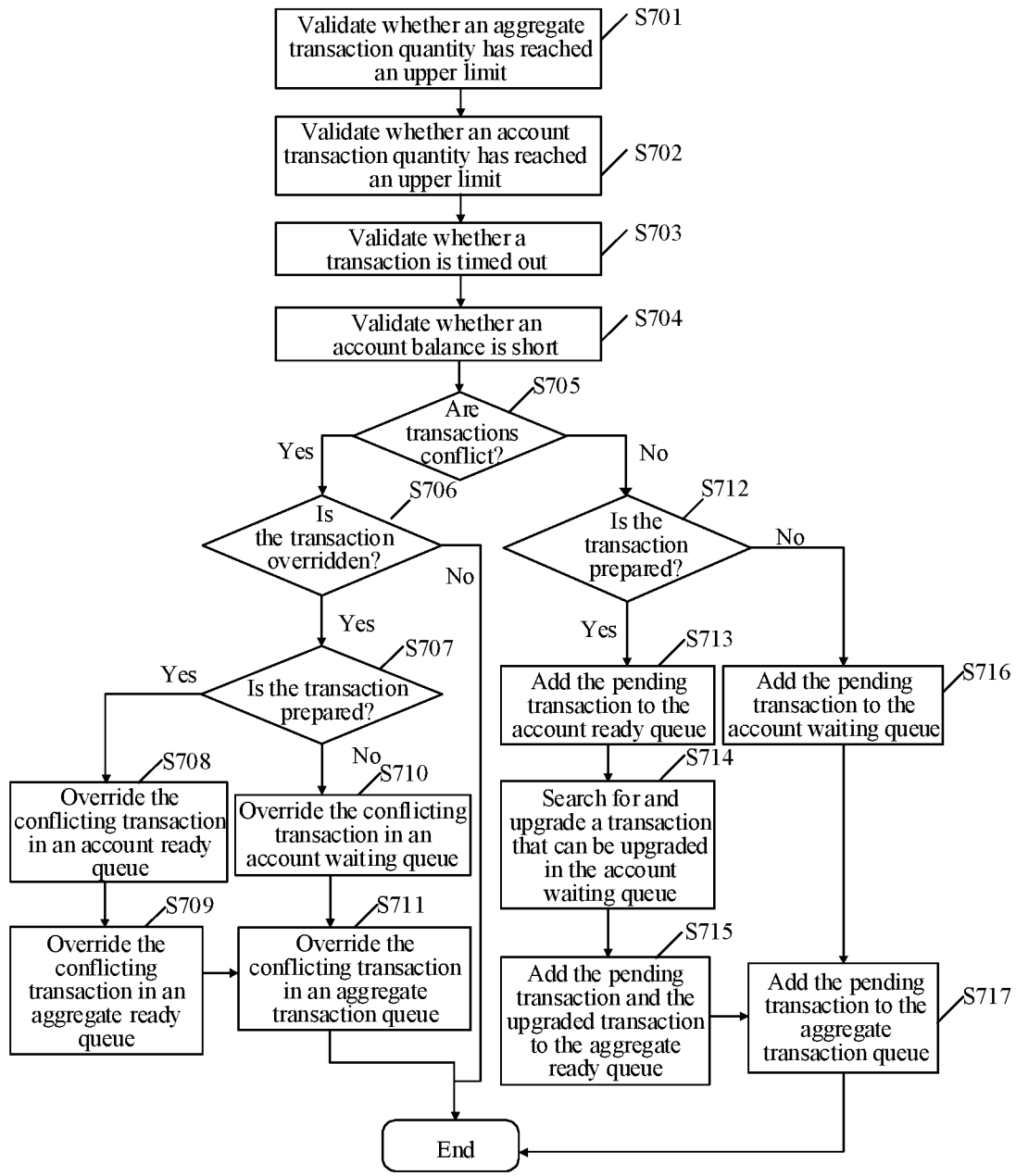
FIG. 7 is a flow diagram of a transaction receiving method according to an embodiment of this application.

Reference is made to FIG. 7 which is a flow diagram of a transaction receiving method according to an embodiment of this application. The transaction receiving method performed by a block chain node (for example, any block chain node in the block chain node system in the above embodiments corresponding to FIG. 1). The block chain node may include the transaction pool, the consensus module, the block chain structure, the world status, and the configuration module described in the above embodiments corresponding to FIG. 1. In addition, the block chain node may construct the account ready queue Hash mapping, the account waiting queue Hash mapping, the account ready queue, the account waiting queue, the aggregate ready queue, and the aggregate transaction queue according to the above embodiments corresponding to FIG. 4 based on the transaction pool. As shown in FIG. 7, after receiving the pending transaction transmitted by the pending account, the block chain node may perform the following operations:

S701: Validate whether an aggregate transaction quantity has reached an upper limit.

The block chain node may, based on an aggregate transaction pool upper limit (also referred to as an aggregate transaction quantity upper limit threshold) in the configuration module, determine whether the transaction quantity of the aggregate transaction queue (also referred to as the aggregate transaction quantity) has exceeded the upper limit, if so, report an error to the pending account and do not cache the pending transaction, and if not, execute S702.

S702: Validate whether an account transaction quantity has reached an upper limit.

The block chain node may acquire an account address in the pending transaction based on a single account upper limit in the configuration module, then find an account ready queue and an account waiting queue corresponding to the pending account based on an account ready queue Hash mapping and an account waiting queue Hash mapping, and determine whether a sum of a quantity of ready transactions and a quantity of waiting transactions included in the queues has exceeded the single account upper limit (also referred to as an account transaction quantity upper limit threshold), if so, report an error to the pending account and do not cache the pending transaction, and if not, execute S703.

S703: Validate whether the transaction is timed out.

The block chain node needs to validate whether the pending transaction is timed out, and if a txNonce of the pending transaction is not less than an accountNonce of the pending account in the current world status, determine the transaction to be not timed out and continue with S704; otherwise, determine the transaction to be timed out and report an error to the pending account and do not cache the pending transaction.

S704: Validate whether an account balance is short.

The block chain node may query the account balance (also referred to as an account resource) of the pending account in the current world status based on the account address carried in the pending transaction, and if the account balance is less than a txFee (also referred to as a transaction execution overhead) of the pending transaction, report an error to the pending account and do not cache the pending transaction, and if the account balance is not less than the txFee of the transaction, execute S705.

S705: Determine whether transactions conflict.

The block chain node may acquire the account ready queue and the account waiting queue corresponding to the pending account based on the account address carried in the pending transaction. Then the block chain node may determine whether there is a transaction of the same txNonce in the account ready queue and the account waiting queue corresponding to the pending account, and determine the transaction of the same txNonce, if present, to be a conflicting transaction, and execute S706. If there is no transaction of the same txNonce, S712 is executed.

S706: Determine whether the transaction is overridden.

The block chain node may acquire the txFee of the pending transaction and the txFee of the conflicting transaction, and if the txFee of the pending transaction is not greater than the txFee of the conflicting transaction, report an error and do not cache the pending transaction, and if the txFee of the pending transaction is greater than the txFee of the conflicting transaction, execute S707.

S707: Validate whether the transaction is prepared.

The block chain node searches for a transaction of the same txNonce in the account ready queue and the account waiting queue corresponding to the pending account based on the account address included in the pending transaction. If the transaction is found in the account ready queue, the pending transaction is determined to be prepared, and S708 is executed. If the transaction is found in the account waiting queue, the pending transaction is determined to be unprepared, and S710 is executed.

S708: Override the conflicting transaction in the account ready queue.

The block chain node deletes the conflicting transaction in the account ready queue corresponding to the pending account based on the account address and the txNonce included in the pending transaction, adds the pending transaction to the account ready queue, and then executes S709.

S709: Override the conflicting transaction in the aggregate ready queue.

The block chain node may delete the conflicting transaction and a transaction Hash of the conflicting transaction in the aggregate ready queue based on the transaction Hash of the conflicting transaction, add the pending transaction and a transaction Hash of the pending transaction to the aggregate ready queue, and then execute S711.

S710: Override the conflicting transaction in the account waiting queue.

The block chain node deletes the conflicting transaction in the account waiting queue corresponding to the pending account based on the account address and the txNonce included in the pending transaction, adds the pending transaction to the account waiting queue, and then executes S711.

S711: Override the conflicting transaction in the aggregate transaction queue.

The block chain node deletes the conflicting transaction and the transaction Hash of the conflicting transaction in the aggregate transaction queue based on the transaction Hash of the conflicting transaction, and adds the pending transaction and the transaction Hash of the pending transaction to the aggregate transaction queue. The flow ends as the receipt of the pending transaction is completed.

S712: Validate whether the transaction is prepared.

The block chain node searches for the account ready queue corresponding to the pending account based on the account address included in the pending transaction, and the following conditions are to be satisfied for the transaction being prepared: the account ready queue being empty, and the txNonce of the pending transaction being equal to the accountNonce of the pending account in the current world status: or the account ready queue being not empty, and the txNonce of the pending transaction being equal to a txNonce of a last transaction in the account ready queue plus 1. If the pending transaction is prepared, S713 is executed. If the pending transaction is unprepared, S716 is executed.

S713: Add the pending transaction to the account ready queue.

The block chain node may add the pending transaction and the txNonce corresponding to the pending transaction to the account ready queue at a queue tail. That is, the pending transaction will become the last transaction in the account ready queue, and then S714 is executed.

S714: Search for and upgrade a transaction that can be upgraded in the account waiting queue.

The block chain node may search for the transaction that can be upgraded in the account waiting queue, and then upgrade the transaction that can be upgraded. The upgrade refers to moving the transaction from the account waiting queue to the account ready queue. The block chain node continues with S715.

In a possible implementation, a feasible method for the block chain node to determine a presence of a transaction that can be upgraded and upgrade the transaction is as follows. The block chain node may start a loop from a first transaction in the account waiting queue, determine whether the txNonce of the transaction is equal to the txNonce of the last transaction in the account ready queue plus 1, if so, delete the transaction from the account ready queue and add the transaction to the account ready queue (the transaction will become a last transaction in the account ready queue), and record the upgraded transaction.

In a possible implementation, a feasible method for the block chain node to determine a presence of a transaction that can be upgraded and upgrade the transaction is as follows. When transactions in the account waiting queue are arranged in an order of small to large txNonces corresponding to the transactions, the block chain node may determine whether the txNonce of the first transaction in the account waiting queue is equal to the txNonce of the last transaction in the account ready queue plus 1, if so, determine a transaction corresponding to a txNonce that forms a continuous order sequence with the txNonce corresponding to the first transaction in the account waiting queue as an upgraded transaction, and adding the upgraded transaction to the account ready queue.

S715: Add the pending transaction and the upgraded transaction to the aggregate ready queue.

The block chain node may add the pending transaction and the upgraded transaction to the aggregate ready queue and then execute S717.

S716: Add the pending transaction to the account waiting queue.

The block chain node may add the pending transaction and the txNonce corresponding to the pending transaction to the account waiting queue and then execute S717. S717: Add the pending transaction to the aggregate transaction queue.

After the block chain node adds the pending transaction to the aggregate transaction queue, the receiving flow of the pending transaction ends.

With the method provided in the embodiment of this application, a transaction with an unprepared txNonce can be effectively received and cached, and the transaction is normally packed after the txNonce is prepared, thereby improving the error tolerance of the block chain system, and ensuring an effective matching between the txNonce of the packed transactions and the accountNonce in generation of a candidate block, improving the success rate of block generation. In addition, an account is supported to transmit a transaction request with a higher txFee to override a transaction of the same nonce in the transaction pool, increasing the flexibility of the user to use the block chain.

Figure 8:
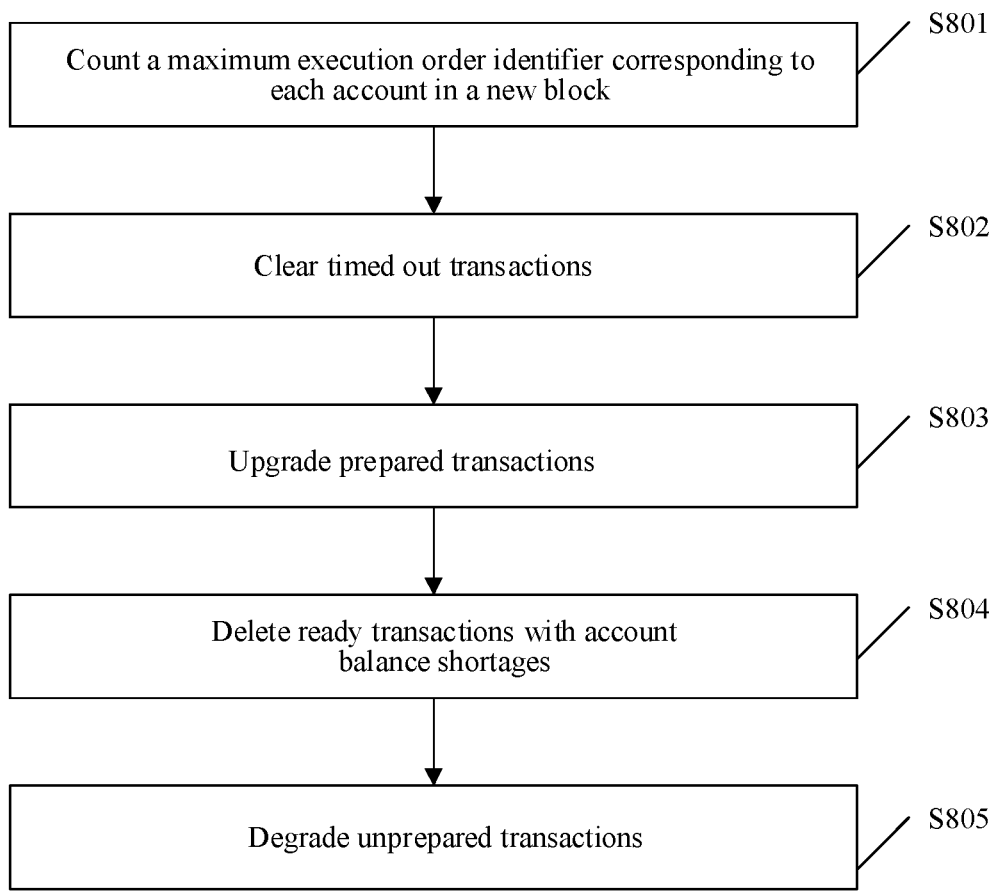
FIG. 8 is a flow diagram of refreshing a transaction pool according to an embodiment of this application.

A block chain node with a block generation authority in a block chain node system may start packing from a first transaction in an aggregate ready queue and pack the transactions on by one into a candidate block, although the number of finally packed transactions is not greater than the block transaction quantity upper limit in the configuration module. Whenever a candidate block becomes a new official block through consensus, each block chain node in the block chain node system may perform a transaction pool refresh operation after insertion of the block into the block chain data structure. In order to facilitate understanding, reference is made to FIG. 8 which is a flow diagram of refreshing a transaction pool according to an embodiment of this application. As shown in FIG. 8, the flow of refreshing the transaction pool includes:

S801: Count a maximum execution order identifier corresponding to each account in a new block.

The block chain node may traverse transactions in the new block, find a maximum txNonce of each account therefrom, establish a Hash mapping from an account address to the maximum txNonce of the account, traverse the Hash mapping, and perform the following S802 to S805 for each account address and the maximum txNonce of the account, separately.

S802: Clear timed out transactions.

The block chain node searches for an account ready queue and an account waiting queue corresponding to the account based on the account address, deletes transactions therefrom of which the txNonces are not greater than the maximum txNonce of the account, deletes transactions in an aggregate ready queue and an aggregate queue based on transaction Hashes of the deleted transactions, and continues with S803.

S803: Upgrade prepared transactions.

The block chain node may search for the corresponding account waiting queue based on the account address, determine whether a txNonce of a first transaction in the account waiting queue is equal to the maximum txNonce of the account plus 1, if so, upgrade the transaction and a subsequent series of transactions with continuous txNonces in the account waiting queue, where the upgrade refers to deleting a transaction from the account waiting queue and adding the transaction to the account ready queue and the aggregate ready queue, and continue with S804.

S804: Delete ready transactions with account balance shortages.

The block chain node may search for a corresponding account ready queue based on the account address, determine whether the txFee of the first transaction of the account ready queue is greater than the account balance of the account to which it belongs in the current world status, if so, delete the transaction from the account ready queue, the aggregate ready queue, and the aggregate queue, and continue with S805.

S805: Degrade unprepared transactions.

For the account of the above transaction deleted due to the account balance shortage, the block chain node degrades all transactions in the account ready queue, where the degrade refers to deleting the transactions from the aggregate ready queue and the account ready queue and adding the transactions to the account waiting queue. The flow is completed.

With the method provided in the embodiment of this application, the time consumption of a refresh operation on a transaction pool, during addition of a new block, is not affected by the size of the transaction pool, but only related to the size of the block, thereby improving the efficiency of the refresh operation on the transaction pool.

Figure 9:
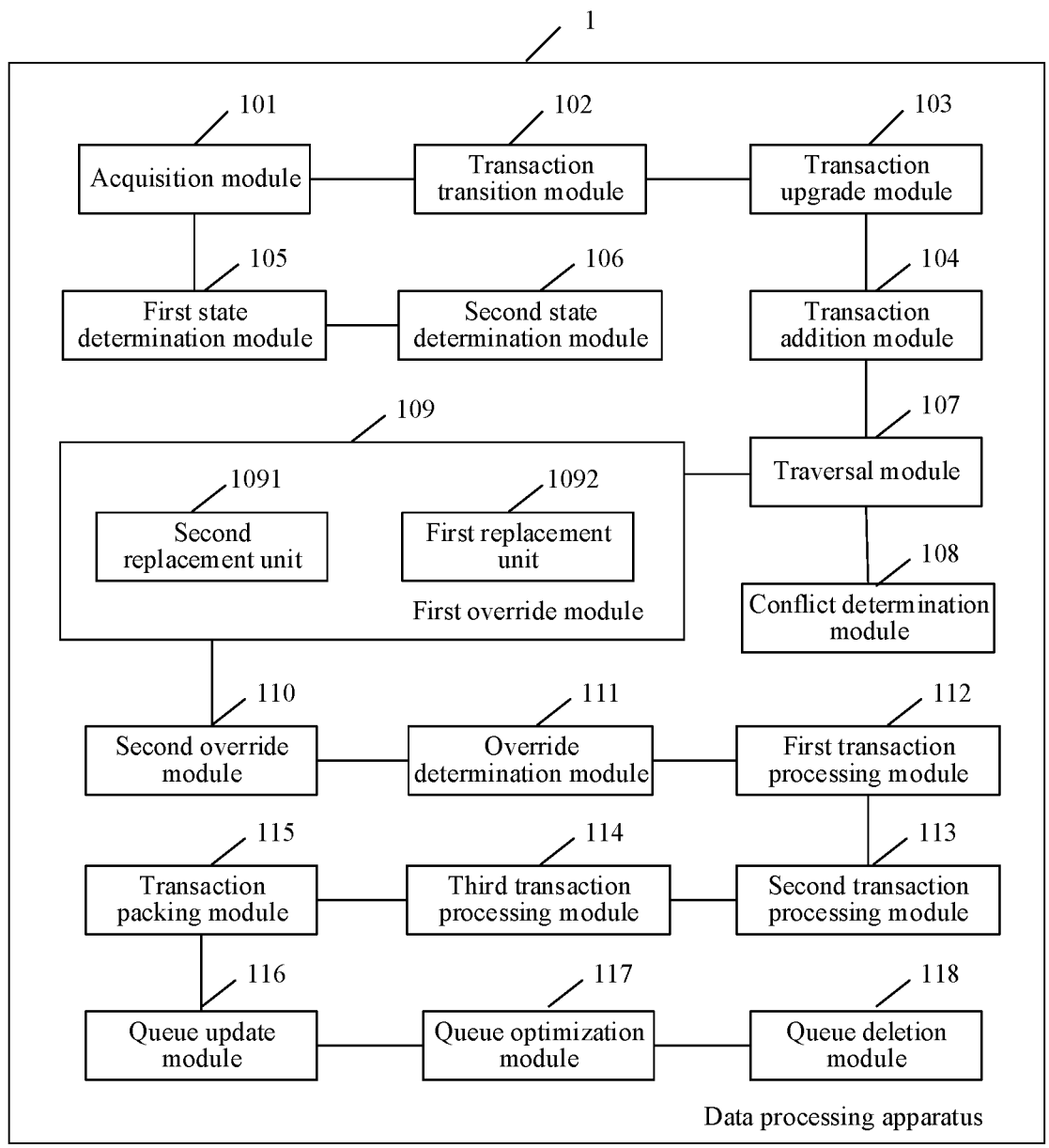
FIG. 9 is a schematic structural diagram of a data processing apparatus according to an embodiment of this application.

Reference is made to FIG. 9 which is a schematic structural diagram of a data processing apparatus according to an embodiment of this application. The data processing apparatus may be a computer program (including program codes) running on a computer device. For example, the data processing apparatus is an application software. The apparatus may be used for performing corresponding steps in the data processing method provided by the embodiment of this application. As shown in FIG. 9, the data processing apparatus 1 may include: an acquisition module 101, a transaction transition module 102, a transaction upgrade module 103, and a transaction addition module 104.

The acquisition module 101 is configured to acquire a pending transaction transmitted by a pending account, and acquire a pending account ready queue and a pending account waiting queue corresponding to the pending account, the pending transaction including a pending execution order identifier, the pending account ready queue being used for storing ready transactions in a prepared state and execution order identifiers with mapping relationships with the ready transactions, and the pending account waiting queue being used for storing waiting transactions in an unprepared state and execution order identifiers with mapping relationships with the waiting transactions.

The transaction transition module 102 is configured to add, in response to determining that the pending transaction is in the prepared state, the pending transaction and the pending execution order identifier to the pending account ready queue to obtain a transitional account ready queue.

The transaction upgrade module 103 is configured to use an execution order identifier that forms a continuous sequence of order identifiers with the pending execution order identifier as an upgraded execution order identifier in the pending account waiting queue, and migrate the upgraded execution order identifier and a waiting transaction corresponding to the upgraded execution order identifier to the transitional account ready queue in sequence to obtain an upgraded account ready queue.

The transaction addition module 104 is configured to add the pending transaction and the waiting transaction corresponding to the upgraded execution order identifier in the upgraded account ready queue to an aggregate ready queue, the transactions in the aggregate ready queue being packed into a candidate block in a transaction insertion time sequence.

The specific implementations of the acquisition module 101, the transaction transition module 102, the transaction upgrade module 103, and the transaction addition module 104 can refer to the description of S101-S104 in the above embodiments corresponding to FIG. 3, which will not be repeated.

Referring again to FIG. 9, the data processing apparatus 1 above further includes: a first state determination module 105.

The first state determination module 105 is configured to compare, in response to the pending account ready queue being an empty queue, the pending execution order identifier with a currently executed transaction identifier of the pending account.

The first state determination module 105 is further configured to determine, in response to the pending execution order identifier and the currently executed transaction identifier of the pending account being the same, that the pending transaction is in the prepared state.

The first state determination module 105 is further configured to determine, in response to the pending execution order identifier and the currently executed transaction identifier of the pending account being different, that the pending transaction is in the unprepared state, and add the pending transaction and the pending execution order identifier to the pending account waiting queue.

The specific implementation of the first state determination module 105 can refer to the description of S102 in the above embodiments corresponding to FIG. 3, which will not be repeated.

Referring again to FIG. 9, the data processing apparatus 1 above further includes: a second state determination module 106.

The second state determination module 106 is configured to determine, in response to the pending account ready queue being the non-empty queue, an identifier relationship between the pending execution order identifier and a maximum execution order identifier in the pending account ready queue.

The second state determination module 106 is further configured to determine, in response to the identifier relationship satisfying a continuous order relationship, that the pending transaction is in the prepared state.

The second state determination module 106 is further configured to determine, in response to the identifier relationship not satisfying the continuous order relationship, that the pending transaction is in the unprepared state, and add the pending transaction and the pending execution order identifier to the pending account waiting queue.

The specific implementation of the second state determination module 106 can refer to the description of S102 in the above embodiments corresponding to FIG. 3, which will not be repeated.

Referring again to FIG. 9, the data processing apparatus 1 above further includes: a traversal module 107, a conflict determination module 108, a first override module 109, and a second override module 110.

The traversal module 107 is configured to traverse, based on the pending execution order identifier, the pending account ready queue and the pending account waiting queue to obtain a traversal result for the pending transaction.

The conflict determination module 108 is further configured to determine, when the traversal result indicates a presence of a transaction with the pending execution order identifier in a pending queue, the transaction with the pending execution order identifier in the pending queue to be a conflicting transaction, the pending queue being the pending account ready queue or the pending account waiting queue.

The first override module 109 is configured to override, in response to determining that a conflict override condition is satisfied between the pending transaction and the conflicting transaction, the conflicting transaction based on the pending transaction.

The second override module 110 is configured to call, in response to the conflict override condition being not satisfied between the pending transaction and the conflicting transaction, the transaction transition module to execute the step of adding, in response to the pending transaction being in the prepared state, the pending transaction and the pending execution order identifier to the pending account ready queue to obtain a transitional account ready queue.

The specific implementations of the traversal module 107, the conflict determination module 108, the first override module 109, and the second override module 110 can refer to the above description of S203-S205 in the above embodiments corresponding to FIG. 5, which will not be repeated.

Referring again to FIG. 9, the data processing apparatus 1 above further includes: an override determination module 111.

The override determination module 111 is configured to acquire a transaction execution overhead of the pending transaction, and acquire a transaction execution overhead of the conflicting transaction.

The override determination module 111 is further configured to determine, in response to the transaction execution overhead of the pending transaction being greater than the transaction execution overhead of the conflicting transaction, that the conflict override condition is satisfied between the pending transaction and the conflicting transaction.

The override determination module 111 is further configured to determine, in response to the transaction execution overhead of the pending transaction being less than or equal to the transaction execution overhead of the conflicting transaction, that the conflict override condition is not satisfied between the pending transaction and the conflicting transaction, and transmit transaction override failure error information to the pending account.

The specific implementation of the override determination module 111 can refer to the description of S204 in the above embodiments corresponding to FIG. 5, which will not be repeated.

Referring again to FIG. 9, the first override module 109 includes: a first replacement unit 1091 and a second replacement unit 1092.

The first replacement unit 1091 is configured to replace, in response to the pending queue being the pending account ready queue, the conflicting transaction with the pending transaction in the pending account ready queue, and the conflicting transaction with the pending transaction in the aggregate ready queue.

The second replacement unit 1092 is configured to replace, in response to the pending queue being the pending account waiting queue, the conflicting transaction with the pending transaction in the pending account waiting queue.

The specific implementations of the first replacement unit 1091 and the second replacement unit 1092 can refer to the description of S204 in the above embodiments corresponding to FIG. 5, which will not be repeated.

Referring again to FIG. 9, the data processing apparatus 1 above further includes: a first transaction processing module 112.

The first transaction processing module 112 is configured to acquire an account transaction quantity upper limit threshold.

The first transaction processing module 112 is further configured to transmit, in response to a sum of a quantity of the ready transactions in the pending account ready queue and a quantity of the waiting transactions in the pending account waiting queue being equal to the account transaction quantity upper limit threshold, transaction upper limit error information to the pending account.

The first transaction processing module 112 is further configured to call, in response to a sum of a quantity of the ready transactions and a quantity of the waiting transactions being less than the account transaction quantity upper limit, the transaction transition module to execute the step of adding, in response to the pending transaction being in the prepared state, the pending transaction and the pending execution order identifier to the pending account ready queue to obtain a transitional account ready queue.

The specific implementation of the first transaction processing module 112 can refer to the description of S201 in the above embodiments corresponding to FIG. 5, which will not be repeated.

Referring again to FIG. 9, the data processing apparatus 1 above further includes: a second transaction processing module 113.

The second transaction processing module 113 is configured to acquire a currently executed transaction quantity of the pending account.

The second transaction processing module 113 is further configured to transmit, in response to the pending execution order identifier being less than the currently executed transaction quantity, transaction time-out error information to the pending account.

The second transaction processing module 113 is further configured to call, in response to the pending execution order identifier being greater than or equal to the currently executed transaction quantity, the transaction transition module to execute the step of adding, in response to the pending transaction being in the prepared state, the pending transaction and the pending execution order identifier to the pending account ready queue to obtain a transitional account ready queue.

The specific implementation of the second transaction processing module 113 can refer to the description of S201 in the above embodiments corresponding to FIG. 5, which will not be repeated.

Referring again to FIG. 9, the data processing apparatus 1 above further includes: a third transaction processing module 114.

The third transaction processing module 114 is configured to acquire a transaction execution overhead of the pending transaction, and query an account resource of the pending account.

The third transaction processing module 114 is further configured to transmit, in response to the account resource being less than the transaction execution overhead, resource shortage error information to the pending account.

The third transaction processing module 114 is further configured to call, in response to the account resource being greater than or equal to the transaction execution overhead, the transaction transition module to execute the step of adding, in response to the pending transaction being in the prepared state, the pending transaction and the pending execution order identifier to the pending account ready queue to obtain a transitional account ready queue.

The specific implementation of the third transaction processing module 114 can refer to the description of S201 in the above embodiments corresponding to FIG. 5, which will not be repeated.

Referring again to FIG. 9, the data processing apparatus 1 above further includes: a transaction packing module 115 and a queue update module 116.

The transaction packing module 115 is configured to pack transactions in the aggregate ready queue into a candidate block in a transaction insertion time sequence, a transaction quantity in the candidate block being less than or equal to a block transaction quantity threshold.

The queue update module 116 is configured to perform consensus processing on the candidate block to obtain a new block, and traverse the new block to obtain a maximum execution order identifier of the pending account.

The queue update module 116 is further configured to acquire a ready transaction with a mapping relationship with a first to-be-deleted execution order identifier in a pending account ready queue as a to-be-deleted ready transaction, the first to-be-deleted execution order identifier being an execution order identifier that is less than or equal to the maximum execution order identifier in the pending account ready queue.

The queue update module 116 is further configured to delete the to-be-deleted ready transaction and the first to-be-deleted execution order identifier in the pending account ready queue to obtain an updated account ready queue.

The queue update module 116 is further configured to delete the to-be-deleted ready transaction in the aggregate ready queue to obtain an updated aggregate ready queue.

The queue update module 116 is further configured to acquire a waiting transaction with a mapping relationship with a second to-be-deleted execution order identifier in the pending account waiting queue as a to-be-deleted waiting transaction, the second to-be-deleted execution order identifier being an execution order identifier that is less than or equal to the maximum execution order identifier in the pending account waiting queue.

The queue update module 116 is further configured to delete the to-be-deleted waiting transaction and the second to-be-deleted execution order identifier in the pending account waiting queue to obtain an updated account waiting queue.

The specific implementations of the transaction packing module 115 and the queue update module 116 can refer to the description of S301-S306 in the above embodiments corresponding to FIG. 6, which will not be repeated.

Referring again to FIG. 9, the data processing apparatus 1 above further includes: a queue optimization module 117.

The queue optimization module 117 is configured to acquire a minimum execution order identifier in the updated account waiting queue.

The queue optimization module 117 is further configured to generate an optimized execution order identifier base on the maximum execution order identifier.

The queue optimization module 117 is further configured to use, in response to the minimum execution order identifier being equal to the optimized execution order identifier, an execution order identifier that forms a continuous sequence of order identifiers with the minimum execution order identifier as an optimized upgraded execution order identifier in the pending account waiting queue, and migrate the minimum execution order identifier, a waiting transaction corresponding to the minimum execution order identifier, the optimized upgraded execution order identifier, and a waiting transaction corresponding to the optimized upgraded execution order identifier to the updated account ready queue in sequence to obtain an optimized upgraded account ready queue.

The queue optimization module 117 is further configured to add the minimum execution order identifier, the waiting transaction corresponding to the minimum execution order identifier, the optimized upgraded execution order identifier, and the waiting transaction corresponding to the optimized upgraded execution order identifier to the updated aggregate ready queue to obtain an optimized upgraded aggregate ready queue.

The specific implementation of the queue optimization module 117 can refer to the description of an embodiment in the above embodiments corresponding to FIG. 6, which will not be repeated.

Referring again to FIG. 9, the data processing apparatus 1 above further includes: a queue deletion module 118.

The queue deletion module 118 is configured to acquire a ready transaction corresponding to the minimum execution order identifier in the updated account ready queue as a to-be-checked ready transaction.

The queue deletion module 118 is further configured to acquire a transaction execution overhead of the to-be-checked ready transaction, and query an account resource of the pending account.

The queue deletion module 118 is further configured to delete, in response to the transaction execution overhead of the to-be-checked ready transaction being greater than the account resource, the to-be-checked ready transaction and the minimum execution order identifier from the updated account ready queue, and delete the to-be-checked ready transaction from the updated aggregate ready queue.

The queue deletion module 118 is further configured to use an execution order identifier greater than the minimum execution order identifier as a degraded execution order identifier in an updated account ready queue with deletion, and migrate the degraded execution order identifier and a ready transaction corresponding to the degraded execution order identifier to the updated account waiting queue to obtain a degraded account waiting queue.

The queue deletion module 118 is further configured to delete the degraded execution order identifier and the ready transaction corresponding to the degraded execution order identifier from the updated account ready queue with deletion.

The queue deletion module 118 is further configured to delete the degraded execution order identifier and the ready transaction corresponding to the degraded execution order identifier from an updated aggregate ready queue with deletion.

The specific implementation of the queue deletion module 118 can refer to the description of an embodiment in the above embodiments corresponding to FIG. 6, which will not be repeated.

Figure 10:
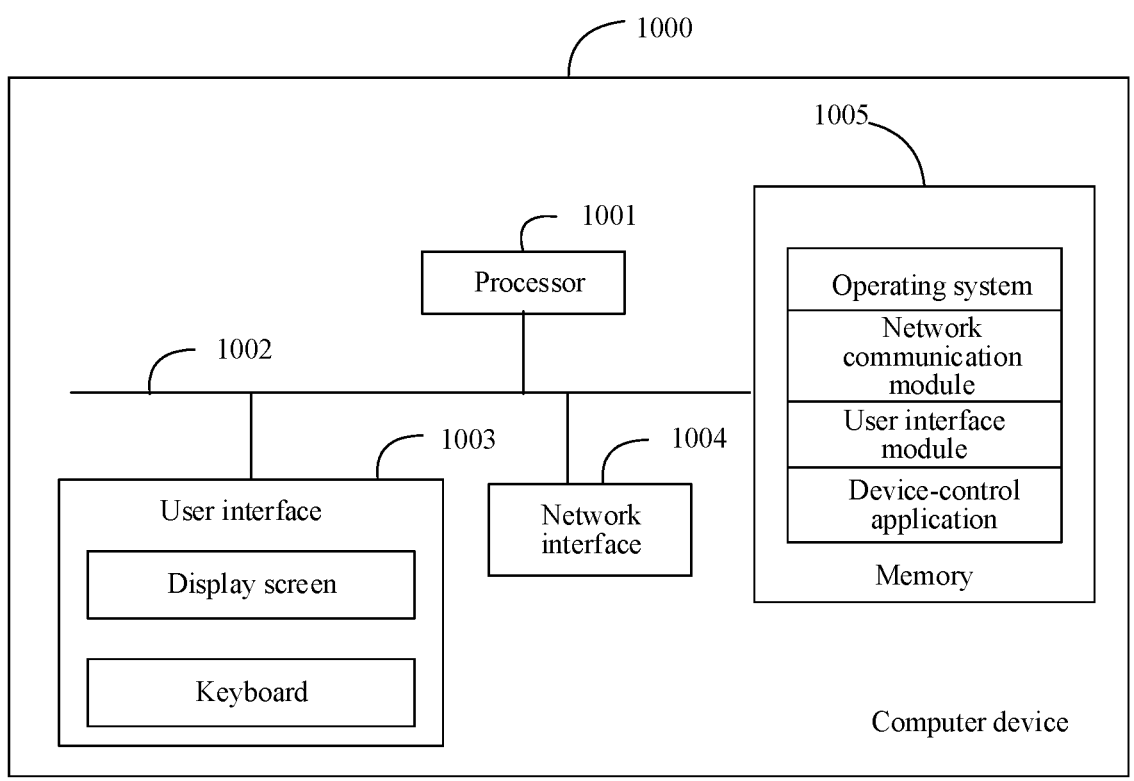
FIG. 10 is a schematic structural diagram of a computer device according to an embodiment of this application.

Reference is made to FIG. 10 which is a schematic structural diagram of a computer device according to an embodiment of this application. As shown in FIG. 10, the data processing apparatus 1 in the above embodiments corresponding to FIG. 9 is applicable to a computer device 1000, and the computer device 1000 may include: a processor 1001, a network interface 1004, and a memory 1005, and the above computer device 1000 may further include: a user interface 1003, and at least one communication bus 1002. The communication bus 1002 is used for enabling connection and communication among these components. The user interface 1003 may include a display and a keyboard. In some embodiments, the user interface 1003 may further include a standard wired interface and wireless interface. The network interface 1004 may include a standard wired interface and wireless interface (such as a WI-FI interface). The memory 1005 may be a high-speed RAM memory or a non-volatile memory, such as at least one disk memory. The memory 1005 may be at least one storage device positioned remotely from the aforementioned processor 1001. As shown in FIG. 10, the memory 1005, as a computer-readable storage medium, may include an operating system, a network communication module, a user interface module, and a device-control application.

In the computer device 1000 shown in FIG. 10, the network interface 1004 can provide a network communication network element. The user interface 1003 is mainly used for providing an interface for user input. The processor 1001 can be used for calling the device-control application stored in the memory 1005 to implement the following steps:

Acquire a pending transaction transmitted by a pending account, and acquire a pending account ready queue and a pending account waiting queue corresponding to the pending account. The pending transaction includes a pending execution order identifier. The pending account ready queue is used for storing ready transactions in a prepared state and execution order identifiers with mapping relationships with the ready transactions. The pending account waiting queue is used for storing waiting transactions in an unprepared state and execution order identifiers with mapping relationships with the waiting transactions.

Add, in response to determining that the pending transaction is in the prepared state, the pending transaction and the pending execution order identifier to the pending account ready queue to obtain a transitional account ready queue.

Use an execution order identifier that forms a continuous sequence of order identifiers with the pending execution order identifier as an upgraded execution order identifier in the pending account waiting queue, and add the upgraded execution order identifier and a waiting transaction corresponding to the upgraded execution order identifier to the transitional account ready queue in sequence to obtain an upgraded account ready queue.

Add the pending transaction and the waiting transaction corresponding to the upgraded execution order identifier in the upgraded account ready queue to an aggregate ready queue. The transactions in the aggregate ready queue are packed into a candidate block in a transaction insertion time sequence.

It is to be understood that the computer device 1000 described in the embodiment of this application may perform the description of any of the preceding embodiments on the data processing method, which will not be repeated. In addition, the description of beneficial effects of the same method is not repeated as well.

Furthermore, an embodiment of this application further provides a computer-readable storage medium storing the computer program executed by the above-mentioned data processing apparatus 1, and the computer program above includes program instructions which, when executed by the above processor, can perform the description of any of the preceding embodiments on the data processing method above, which will therefore not be repeated. In addition, the description of beneficial effects of the same method is not repeated as well. For technical details that are not disclosed in the embodiments of the computer-readable storage medium of this application, reference may be made to the descriptions of the method embodiments of this application.

The computer-readable storage medium above may be a data processing apparatus provided by any of the preceding embodiments, or an internal storage unit of the computer device above, such as a hard disk or an internal memory of the computer device. The computer-readable storage medium may also be an external storage device of the computer device, such as a plug-in hard disk, a smart media card (SMC), a secure digital (SD) card, or a flash card provided on the computer device. Further, the computer-readable storage medium can include both the internal storage unit and the external storage device of the computer device. The computer-readable storage medium is used for storing the computer program and other programs and data needed by the computer device. The computer-readable storage medium can also be used for temporarily storing data that has been or will be output.

Furthermore, an embodiment of this application provides a computer program product or computer program including a computer instruction stored in a computer-readable storage medium. A processor of a computer device reads the computer instruction from the computer-readable storage medium, and the processor executes the computer instruction to cause the computer device to perform the method provided by any of embodiments corresponding to FIG. 3 and FIG. 4 above.

The terms "first", "second", and the like in the description of embodiments, claims, and drawings of this application are used for distinguishing between different objects and not necessarily for describing a specific order. Furthermore, the term "include" and any variations thereof are intended to encompass a non-exclusive inclusion. For example, a process, method, apparatus, product, or device that includes a list of steps or units is not limited to the listed steps or modules, but may include additional steps or modules not listed or may include additional steps or units inherent to such process, method, apparatus, product, or device. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Those skilled in the art may recognize that the units and algorithm steps of the examples described in connection with the embodiments disclosed herein can be implemented in electronic hardware, computer software, or a combination thereof, and that the components and steps of the examples have been described above generally in terms of network elements to clearly illustrate the interchangeability of hardware and software. Whether such network elements are implemented in hardware or software depends upon particular application and design constraints on the technical solutions. Those skilled in the art may implement the described network elements in varying ways for each particular application, but such implementations are not to be interpreted as departing from the scope of this application.

The above disclosures are merely exemplary embodiments of this application, and are of course not intended to limit the scope of the claims of this application, and therefore, equivalent changes made according to the claims of this application still fall within the scope of this application.

What is claimed is:

1. A block chain-based data processing method performed by a computer device, the method comprising:
acquiring a pending transaction, a pending account ready queue and a pending account waiting queue corresponding to a pending account; the pending transaction comprising a pending execution order identifier;
in response to determining that the pending transaction is in a prepared state, adding the pending transaction and the pending execution order identifier to the pending account ready queue to obtain a transitional account ready queue;
using an execution order identifier that forms a continuous sequence of order identifiers with the pending execution order identifier as an upgraded execution order identifier in the pending account waiting queue, and migrating the upgraded execution order identifier and a waiting transaction corresponding to the upgraded execution order identifier to the transitional account ready queue in sequence to obtain an upgraded account ready queue; and adding the pending transaction and the waiting transaction corresponding to the upgraded execution order identifier in the upgraded account ready queue to an aggregate ready queue;

wherein the determining that the pending transaction is in a prepared state comprises:

determining, in response to the pending account ready queue being a non-empty queue, an identifier relationship between the pending execution order identifier and a maximum execution order identifier in the pending account ready queue; and determining, in response to the identifier relationship satisfying a continuous order relationship, that the pending transaction is in the prepared state.

2. The method according to claim 1, wherein the determining that the pending transaction is in a prepared state comprises:

comparing, in response to the pending account ready queue being an empty queue, the pending execution order identifier with a currently executed transaction quantity of the pending account; and determining, in response to the pending execution order identifier and the currently executed transaction quantity of the pending account being the same, that the pending transaction is in the prepared state.

3. The method according to claim 2, further comprising:

determining, in response to the pending execution order identifier and the currently executed transaction quantity of the pending account being different, that the pending transaction is in the unprepared state, and adding the pending transaction and the pending execution order identifier to the pending account waiting queue.

4. The method according to claim 1, further comprising:

determining, in response to the identifier relationship not satisfying the continuous order relationship, that the pending transaction is in the unprepared state, and adding the pending transaction and the pending execution order identifier to the pending account waiting queue.

5. The method according to claim 1, further comprising:

acquiring an account transaction quantity upper limit threshold;

transmitting, in response to a sum of a quantity of the ready transactions and a quantity of the waiting transactions being equal to the account transaction quantity upper limit threshold, transaction upper limit error information to the pending account; and performing, in response to the sum of the quantity of the ready transactions and the quantity of the waiting transactions being less than the account transaction quantity upper limit, an operation of the adding, in response to determining that the pending transaction is in the prepared state, the pending transaction and the pending execution order identifier to the pending account ready queue to obtain a transitional account ready queue.

6. The method according to claim 1, further comprising:

acquiring a currently executed transaction quantity of the pending account;

transmitting, in response to the pending execution order identifier being less than the currently executed transaction quantity, transaction time-out error information to the pending account; and performing, in response to the pending execution order identifier being greater than or equal to the currently executed transaction quantity, an operation of the adding, in response to the pending transaction being in the prepared state, the pending transaction and the pending execution order identifier to the pending account ready queue to obtain a transitional account ready queue.

7. A computer device, comprising: a processor, a memory, and a network interface;

the processor being connected to the memory and the network interface, the network interface being configured to provide a data communication function, the memory being configured to store program codes that, when executed by the processor, cause the computer device to perform a block chain-based data processing method including:

acquiring a pending transaction, a pending account ready queue and a pending account waiting queue corresponding to a pending account; the pending transaction comprising a pending execution order identifier;

in response to determining that the pending transaction is in a prepared state, adding the pending transaction and the pending execution order identifier to the pending account ready queue to obtain a transitional account ready queue;

using an execution order identifier that forms a continuous sequence of order identifiers with the pending execution order identifier as an upgraded execution order identifier in the pending account waiting queue, and migrating the upgraded execution order identifier and a waiting transaction corresponding to the upgraded execution order identifier to the transitional account ready queue in sequence to obtain an upgraded account ready queue; and adding the pending transaction and the waiting transaction corresponding to the upgraded execution order identifier in the upgraded account ready queue to an aggregate ready queue;

wherein the determining that the pending transaction is in a prepared state comprises:

determining, in response to the pending account ready queue being a non-empty queue, an identifier relationship between the pending execution order identifier and a maximum execution order identifier in the pending account ready queue; and determining, in response to the identifier relationship satisfying a continuous order relationship, that the pending transaction is in the prepared state.

8. The computer device according to claim 7, wherein the determining that the pending transaction is in a prepared state comprises:

comparing, in response to the pending account ready queue being an empty queue, the pending execution order identifier with a currently executed transaction quantity of the pending account; and determining, in response to the pending execution order identifier and the currently executed transaction quantity of the pending account being the same, that the pending transaction is in the prepared state.

9. The computer device according to claim 8, wherein the method further comprises:

determining, in response to the pending execution order identifier and the currently executed transaction quantity of the pending account being different, that the pending transaction is in the unprepared state, and adding the pending transaction and the pending execution order identifier to the pending account waiting queue.

10. The computer device according to claim 7, wherein the method further comprises:
determining, in response to the identifier relationship not satisfying the continuous order relationship, that the pending transaction is in the unprepared state, and adding the pending transaction and the pending execution order identifier to the pending account waiting queue.

11. The computer device according to claim 7, wherein the method further comprises:
acquiring an account transaction quantity upper limit threshold;
transmitting, in response to a sum of a quantity of the ready transactions and a quantity of the waiting transactions being equal to the account transaction quantity upper limit threshold, transaction upper limit error information to the pending account; and
performing, in response to the sum of the quantity of the ready transactions and the quantity of the waiting transactions being less than the account transaction quantity upper limit, an operation of the adding, in response to determining that the pending transaction is in the prepared state, the pending transaction and the pending execution order identifier to the pending account ready queue to obtain a transitional account ready queue.

12. The computer device according to claim 7, wherein the method further comprises:
acquiring a currently executed transaction quantity of the pending account;
transmitting, in response to the pending execution order identifier being less than the currently executed transaction quantity, transaction time-out error information to the pending account; and
performing, in response to the pending execution order identifier being greater than or equal to the currently executed transaction quantity, an operation of the adding, in response to the pending transaction being in the prepared state, the pending transaction and the pending execution order identifier to the pending account ready queue to obtain a transitional account ready queue.

13. A non-transitory computer-readable storage medium storing a computer program that, when executed by a processor of a computer device, causes the computer device to perform a block chain-based data processing method including:
acquiring a pending transaction, a pending account ready queue and a pending account waiting queue corresponding to a pending account; the pending transaction comprising a pending execution order identifier;
in response to determining that the pending transaction is in a prepared state, adding the pending transaction and the pending execution order identifier to the pending account ready queue to obtain a transitional account ready queue;
using an execution order identifier that forms a continuous sequence of order identifiers with the pending execution order identifier as an upgraded execution order identifier in the pending account waiting queue, and migrating the upgraded execution order identifier and a waiting transaction corresponding to the upgraded execution order identifier to the transitional account ready queue in sequence to obtain an upgraded account ready queue; and adding the pending transaction and the waiting transaction corresponding to the upgraded execution order identifier in the upgraded account ready queue to an aggregate ready queue;
wherein the determining that the pending transaction is in a prepared state comprises:
determining, in response to the pending account ready queue being a non-empty queue, an identifier relationship between the pending execution order identifier and a maximum execution order identifier in the pending account ready queue; and
determining, in response to the identifier relationship satisfying a continuous order relationship, that the pending transaction is in the prepared state.

14. The non-transitory computer-readable storage medium according to claim 13, wherein the determining that the pending transaction is in a prepared state comprises:
comparing, in response to the pending account ready queue being an empty queue, the pending execution order identifier with a currently executed transaction quantity of the pending account; and
determining, in response to the pending execution order identifier and the currently executed transaction quantity of the pending account being the same, that the pending transaction is in the prepared state.

15. The non-transitory computer-readable storage medium according to claim 14, wherein the method further comprises:
determining, in response to the pending execution order identifier and the currently executed transaction quantity of the pending account being different, that the pending transaction is in the unprepared state, and adding the pending transaction and the pending execution order identifier to the pending account waiting queue.

16. The non-transitory computer-readable storage medium according to claim 13, wherein the method further comprises:
determining, in response to the identifier relationship not satisfying the continuous order relationship, that the pending transaction is in the unprepared state, and adding the pending transaction and the pending execution order identifier to the pending account waiting queue.

17. The non-transitory computer-readable storage medium according to claim 13, wherein the method further comprises:
acquiring an account transaction quantity upper limit threshold;
transmitting, in response to a sum of a quantity of the ready transactions and a quantity of the waiting transactions being equal to the account transaction quantity upper limit threshold, transaction upper limit error information to the pending account; and
performing, in response to the sum of the quantity of the ready transactions and the quantity of the waiting transactions being less than the account transaction quantity upper limit, an operation of the adding, in response to determining that the pending transaction is in the prepared state, the pending transaction and the pending execution order identifier to the pending account ready queue to obtain a transitional account ready queue.

* * * * *